(12) United States Patent
Jeong

(10) Patent No.: US 12,094,371 B2
(45) Date of Patent: Sep. 17, 2024

(54) DISPLAY APPARATUS

(71) Applicant: LG Display Co., Ltd., Seoul (KR)

(72) Inventor: Yeonjae Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/240,982

(22) Filed: Aug. 31, 2023

(65) Prior Publication Data

US 2024/0161659 A1    May 16, 2024

(30) Foreign Application Priority Data

Oct. 25, 2022    (KR) .................. 10-2022-0138665

(51) Int. Cl.
*G09F 9/30*        (2006.01)
*G06F 1/16*        (2006.01)
(52) U.S. Cl.
CPC ............ *G09F 9/301* (2013.01); *G06F 1/1652* (2013.01)

(58) Field of Classification Search
CPC .............................. G09F 9/301; G06F 1/1652
See application file for complete search history.

(56) References Cited

U.S. PATENT DOCUMENTS

2020/0017725 A1\* 1/2020 Lee .................. C09J 133/14
2023/0135958 A1\* 5/2023 Song ................ G06F 1/1616
                                            361/679.01

\* cited by examiner

*Primary Examiner* — Karabi Guharay
(74) *Attorney, Agent, or Firm* — Seed IP Law Group LLP

(57) ABSTRACT

A display apparatus includes a display panel, a first adhesive member on the display panel, a first cover member on the first adhesive member, a second adhesive member on the first cover member, the second adhesive member including a material different from a material of the first adhesive member, and a second cover member on the second adhesive member.

24 Claims, 17 Drawing Sheets

FIG. 9

| | contact angle(°) | | | |
|---|---|---|---|---|
| A | 114.3° | 115.4° | 113.6° | 112.7° |
| | 114.0° | | | |
| B | 84.5° | 97.6° | 102.8° | 86.0° |
| | 92.7° | | | |

DISPLAY APPARATUS

CROSS-REFERENCE TO RELATED APPLICATIONS

This application claims the benefit of the Korean Patent Application No. 10-2022-0138665 filed on Oct. 25, 2022, which is hereby incorporated by reference as if fully set forth herein.

BACKGROUND

Technical Field

The present disclosure relates to a display apparatus.

Description of the Related Art

As society advances to the information-oriented society, various display apparatuses for processing and displaying massive information have been developed. Display apparatuses for displaying an image include various kinds of display apparatuses such as liquid crystal display (LCD) apparatuses, organic light emitting display apparatuses, and electrophoresis display apparatuses.

Users, who watch broadcasting or video or enjoy a video game through a display apparatus, prefer portable display apparatuses including a large screen. However, when a screen of each portable display apparatus is enlarged, portability is reduced, and due to this, there is a limitation in configuring a large screen on a portable display apparatus. To satisfy both of a large screen and portability, research for foldable display apparatuses where a display panel can be folded and unfolded is being actively done.

BRIEF SUMMARY

A display apparatus may include an adhesive member having a low modulus (for example, storage modulus) and a sufficient adhesive force for satisfying a folding characteristic so that a display panel can be folded and unfolded. There may be a problem where an adhesive member of a protection film disposed at an uppermost portion of a display apparatus is difficult to be implemented as an adhesive member having a sufficient adhesive force capable of satisfying a folding characteristic.

The present disclosure addresses the problems described above and have performed various research and experiments for improving a folding characteristic and an adhesive force of a display apparatus. Based on the various research and experiments, the present disclosure is directed to a new display apparatus in which a folding characteristic and an adhesive force of the display apparatus are improved, and thus, the reliability of the display apparatus is enhanced.

An aspect of the present disclosure is directed to providing a display apparatus in which a folding characteristic and an adhesive force of the display apparatus are improved, and thus, the reliability of the display apparatus is enhanced.

Additional advantages, aspects, and features of the disclosure are set forth in part in the present disclosure and will also be apparent from the present disclosure or may be learned by concepts provided herein. Other features, advantages, and aspects of the present disclosure may be realized and attained by the structure particularly pointed out in the present disclosure, or derivable therefrom, and claims hereof as well as the appended drawings.

To achieve these and other advantages and aspects of the present disclosure, as embodied and broadly described herein, in one or more aspects, a display apparatus may include a display panel, a first adhesive member on the display panel, and a first cover member on the first adhesive member. Also, the display apparatus may include a second adhesive member, which is disposed on the first cover member and is formed of a material different from that of the first adhesive member (or includes a material different from that of the first adhesive member), and a second cover member on the second adhesive member.

According to an embodiment of the present disclosure, a shear strain of an adhesive member applied to a display apparatus may be improved, thereby the performance and/or reliability of the display apparatus may be enhanced.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are exemplary and explanatory and are intended to provide further explanation of the disclosures as claimed.

BRIEF DESCRIPTION OF THE SEVERAL VIEWS OF THE DRAWINGS

The accompanying drawings, which are included to provide a further understanding of the present disclosure, are incorporated in and constitute a part of the present disclosure, illustrate aspects and embodiments of the present disclosure and together with the description serve to explain the principles of the present disclosure.

FIG. 9 illustrates a contact angle of an anti-fingerprint part provided on a cover member according to another embodiment of the present disclosure.

Figure 1:
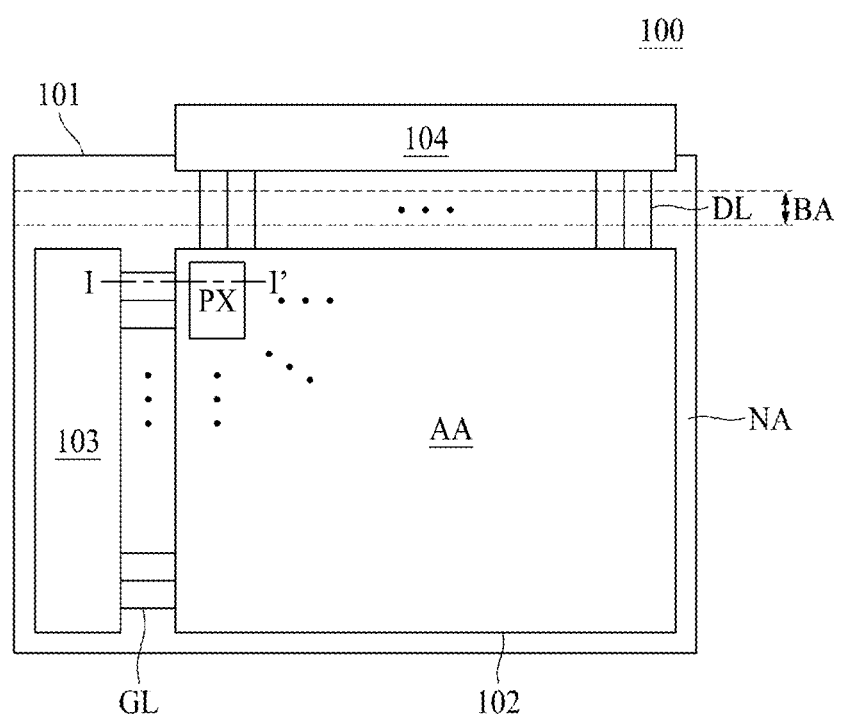
FIG. 1 illustrates a display apparatus according to an embodiment of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction of thereof may be exaggerated for clarity, illustration, and convenience. However, relationships between sizes of the elements are representative of a final product option.

DETAILED DESCRIPTION

Reference is now made in detail to embodiments of the present disclosure, examples of which may be illustrated in the accompanying drawings. In the following description, where a detailed description of relevant known functions or configurations may unnecessarily obscure aspects of the present disclosure, a detailed description of such known functions or configurations may be omitted for brevity. The progression of processing steps and/or operations described is an example, and the sequence of steps and/or operations is not limited to that set forth herein and may be changed, with the exception of steps and/or operations necessarily occurring in a particular order.

Advantages and features of the present disclosure, and implementation methods thereof will be clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand concepts without limiting the protection scope of the present disclosure.

The shapes, dimensions, areas, ratios, angles, numbers, and the like disclosed in the drawings for describing embodiments of the present disclosure are merely examples, and thus, the present disclosure is not limited to the illustrated details. Like reference numerals refer to like elements throughout the decription.

Where the term "comprise," "have," "include," "contain," "constitute," "made up of," "formed of" or the like is used, one or more other elements may be added unless a term such as "only" or the like is used. The terms used in the present disclosure are merely used to describe particular embodiments, and are not intended to limit the scope of the present disclosure. The terms of a singular form may include plural forms unless the context clearly indicates otherwise.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship where the positional relationship between two parts is described, for example, using "on," "over," "under," "above," "below," "beneath," "near," "close to," "adjacent to," "beside," "next to," "on a side of" or the like, one or more other parts may be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," "next to" or "on a side of" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, where the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It will be understood that, although the terms "first," "second," or the like may be used herein to describe various elements, these elements should not be limited by these terms, for example, to any particular order, precedence, or number of elements. These terms are only used to distinguish one element from another element. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify corresponding element(s) from other element(s), and they are not used to define the essence, basis, order, or number of the elements.

For the expression that an element or layer is described as "connected," "coupled," "attached," or "adhered" to another element or layer the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The terms such as a "line" or "direction" should not be interpreted only based on a geometrical relationship in which the respective lines or directions are parallel or perpendicular to each other. Such terms may mean a wider range of lines or directions within which the components of the present disclosure can operate functionally.

The term "at least one" should be understood as including any and all combinations of one or more of the associated listed items. For example, the meaning of "at least one of a first item, a second item, and a third item" encompasses the combination of all three listed items, combinations of any two of the first item, the second item, and the third item as well as any individual item, that is, the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any combination of two of A, B, and C; and all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

Depending on the case, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present embodiment may use all types of display panels such as a liquid crystal display panel, an organic light emitting diode (OLED) display panel, a quantum dot (QD) display panel, and an electroluminescent display panel. The display panel according to the present embodiment is not limited to a specific display panel capable of being bezel-bent in a lower back plate supporting structure and a flexible substrate for OLED display panels. Also, a shape or a size of a display panel applied to a display apparatus according to the present embodiment is not limited.

For example, when the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water (or moisture) or oxygen from penetrating into the organic light emitting device layer. Also, a layer provided on the array substrate may include an inorganic light emitting layer (for example, a nano-sized material layer, a quantum dot, or the like).

Features of various embodiments of the present disclosure may be partially or wholly coupled to or combined with each other, and may be variously operated, linked, or driven together in various ways. Embodiments of the present disclosure may be carried out independently from each other, or may be carried out together in a co-dependent or related relationship. In one or more aspects, the components of each apparatus according to various embodiments of the present disclosure may be operatively coupled and configured.

Unless otherwise defined, the terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness. Thus, embodiments of the present disclosure are not limited to a scale, dimension, size, or thickness illustrated in the drawings.

FIG. 1 illustrates a display apparatus according to an embodiment of the present disclosure.

A display apparatus 100 according to an embodiment of the present disclosure may include a display panel 102. The display panel 102 may include a display area (or an active area) AA provided on the substrate 101 and a non-display area (or a non-active area) NA disposed at a periphery of the display area AA.

The substrate 101 may include a plastic material having flexibility so as to be bendable. For example, the substrate 101 may include a material such as polyimide (PI), polyethylene terephthalate (PET), polyethylene naphthalate (PEN), polycarbonate (PC), polyethersulfone (PES), polyarylate (PAR), polysulfone (PSF), or cyclo-olefin copolymer (COC), but embodiments of the present disclosure are not limited thereto. For example, a material of the substrate 101 may not exclude glass. In another embodiment of the present disclosure, the substrate 101 may include a semiconductor material such as a silicon wafer.

The display area AA may be an area where a plurality of subpixels PX are provided to display an image. Each of the plurality of subpixels PX may be an individual unit which emits light. A light emitting device and a driving circuit may be disposed in each of the plurality of subpixels PX. For example, a display device for displaying an image and a circuit part for driving the display device may be disposed in the plurality of subpixels PX. For example, when the display apparatus 100 is an organic light emitting display apparatus, the display device may include an organic light emitting device, and when the display apparatus 100 is a liquid crystal display (LCD) apparatus, the display device may include a liquid crystal device. The plurality of subpixels may include a red subpixel, a green subpixel, a blue subpixel, and/or a white subpixel, but embodiments of the present disclosure are not limited thereto.

The non-display area NA may be an area which does not display an image. The non-display area NA may be an area where various lines and driving integrated circuits (ICs) for driving the plurality of subpixels PX provided in the display area AA are disposed. For example, at least one of a data driver 104 and a gate driver 103 may be disposed in the non-display area NA, but embodiments of the present disclosure are not limited thereto.

The non-display area NA may be an area surrounding the display area AA. For example, the non-display area NA may be disposed at a periphery of the display area AA. For example, the non-display area NA may be an area extending from the display area AA, or may be an area where the plurality of subpixels PX are not provided, but embodiments of the present disclosure are not limited thereto.

The non-display area NA which does not display an image may be a bezel region, or may further include a bending region BA where a substrate 101 is bent, but embodiments of the present disclosure are not limited thereto.

A plurality of data lines DL and a plurality of gate lines GL may be provided in the display area AA. For example, the plurality of data lines DL may be arranged in rows or columns, and the plurality of gate lines GL may be arranged in columns or rows. A subpixel PX may be provided in an area formed or defined by a data line DL and/or a gate line GL.

The subpixel PX of the display area AA may include a thin film transistor (TFT) or a transistor, which includes a semiconductor layer. For example, the TFT or the transistor may include an oxide semiconductor material, but embodiments of the present disclosure are not limited thereto. For example, the TFT may be a transistor, but the terms are not limited thereto.

According to an embodiment of the present disclosure, the gate driver 103 including a gate driving circuit may be disposed in the non-display area NA. The gate driving circuit of the gate driver 103 may sequentially supply a scan signal to the plurality of gate lines GL, and thus, may sequentially drive pixel rows of the display area AA. For example, each of the pixel rows may be a row which includes pixels connected with one gate line. The gate driving circuit may be a scan driving circuit or a gate driver, but the terms are not limited thereto.

The gate driving circuit may be configured with a TFT including a polycrystalline semiconductor layer, configured with a TFT including an oxide semiconductor layer, or configured with a TFT including a polycrystalline semiconductor layer and a TFT including an oxide semiconductor layer, which are paired. In a case where the same semiconductor material is applied to TFTs disposed in the non-display area NA and the display area AA, the TFTs may be formed simultaneously in the same process, but embodiments of the present disclosure are not limited thereto.

The gate driving circuit may include a shift register and a level shifter.

As in the display apparatus according to an embodiment of the present disclosure, the gate driving circuit may be implemented as a gate in panel (GIP) type and may be directly provided in the substrate 101.

The gate driver 103 including the gate driving circuit may sequentially supply a scan signal of an on voltage or an off voltage to a plurality of gate lines.

The gate driver 103 according to an embodiment of the present disclosure may be formed directly in the substrate 101 by a TFT which uses a polycrystalline semiconductor material as a semiconductor layer, or may be formed based on CMOS which is configured with a TFT by a polycrystalline semiconductor material as a semiconductor layer and a TFT by an oxide semiconductor material as a semiconductor layer.

For example, the oxide semiconductor material may include one or more of IGZO(InGaZnO)-based oxide semiconductor material, IZO(InZnO)-based oxide semiconductor material, IGZTO(InGaZnSnO)-based oxide semiconductor material, ITZO(InSnZnO)-based oxide semiconductor material, FIZO(FeInZnO)-based oxide semiconductor material, ZnO-based oxide semiconductor material, SIZO(SiInZnO)-based oxide semiconductor material, and ZnON(Zn-Oxynitride)-based oxide semiconductor material, but embodiments of the present disclosure are not limited thereto.

When the gate driver 103 includes a TFT including a polycrystalline semiconductor layer and a TFT including an oxide semiconductor layer, electron mobility may be high in a channel, and thus, a high resolution and low power consumption may be implemented.

The display apparatus 100 according to an embodiment of the present disclosure may further include the data driver 104 including a data driving circuit. When a specific gate line is enabled by the gate driver 103 including the gate driving circuit, the data driving circuit may convert image data into analog data voltages and may supply the data voltages to a plurality of data lines.

The plurality of gate lines GL disposed in the substrate 101 may include a plurality of scan lines and a plurality of emission control lines. The plurality of scan lines and the plurality of emission control lines may be lines which transfer different kinds of gate signals (a scan signal and an emission control signal) to gate electrodes of different kinds of transistors (a scan transistor and an emission control transistor).

The gate driver 103 including the gate driving circuit may include a scan driving circuit, which outputs scan signals to a plurality of scan lines which belong to a kind of gate line GL, and an emission driving circuit which output emission control signals to a plurality of emission control lines which belong to another kind of gate line.

The display panel 102 according to an embodiment of the present disclosure may further include the bending region BA where the substrate 101 is bent. The bending region BA may be a region where the substrate 101 is bent. The substrate 101 may be maintained in a flat state in a region except the bending region BA. The data line DL may be disposed to pass through the bending region BA, and various data lines DL may be disposed and may be connected with a data pad.

Figure 2:
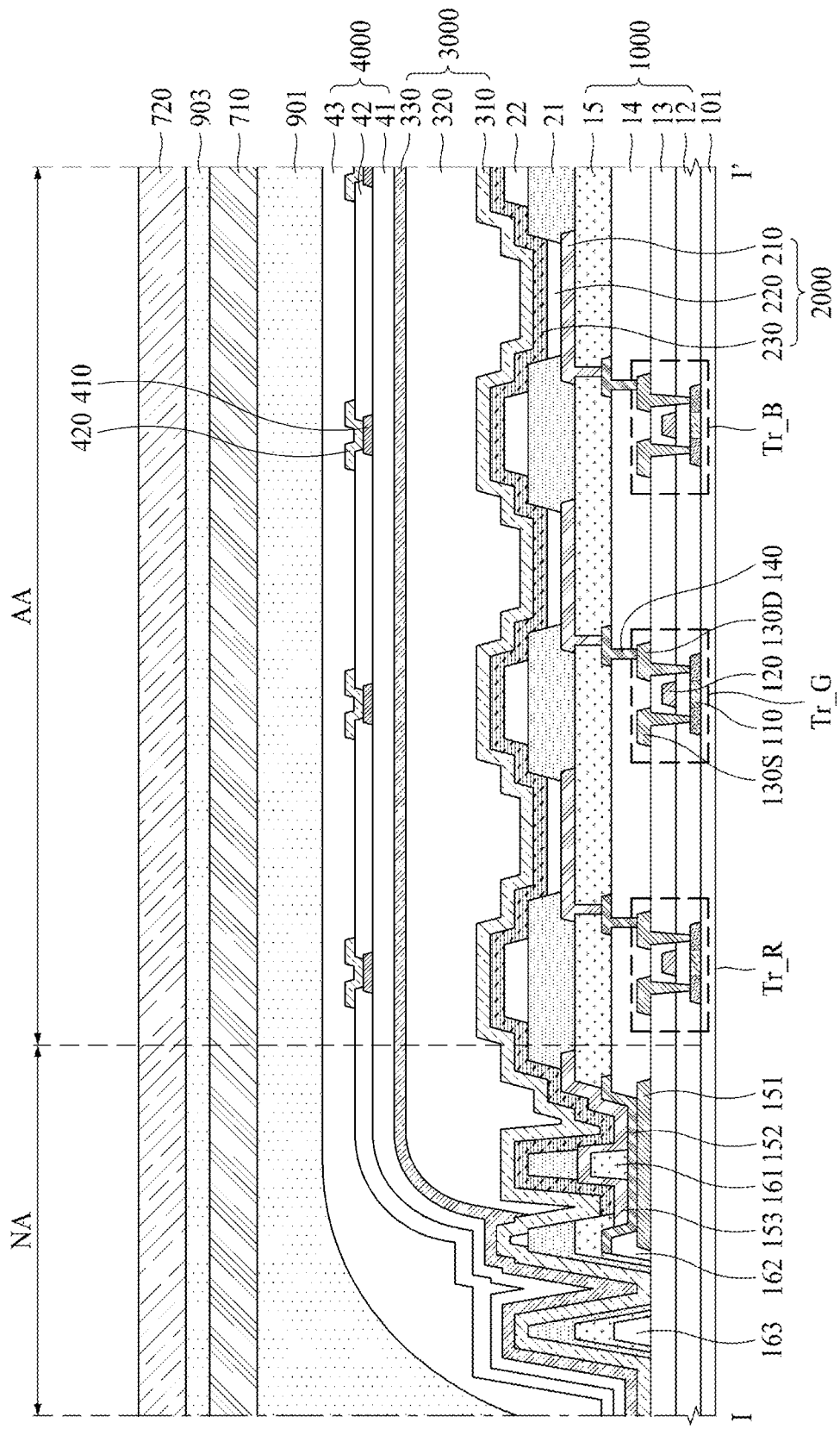
FIG. 2 is a cross-sectional view taken along line I-I' of FIG. 1 according to an embodiment of the present disclosure.

FIG. 2 is a cross-sectional view taken along line I-I' of FIG. 1 according to an embodiment of the present disclosure.

Referring to FIG. 2, the display apparatus according to an embodiment of the present disclosure may include the display area AA and the non-display area NA. The non-display area NA may be disposed at a periphery of the display area AA.

The substrate 101 may include a first substrate, a second substrate, and a middle layer (or an intermediate layer) between the first substrate and the second substrate, but embodiments of the present disclosure are not limited thereto.

For example, the first substrate and the second substrate may be formed of one or more of polyimide, polyethersulfone, polyethylene terephthalate, polycarbonate, but embodiments of the present disclosure are not limited thereto. When the substrate 101 is fomred a plastic material, a manufacturing process of the display apparatus may be performed in a state where a supporting substrate including glass is disposed under the substrate 101, and after the manufacturing process of the display apparatus is completed, the supporting substrate may be released. After the supporting substrate is released, a back plate (or a plate) for supporting the substrate 101 may be disposed under the substrate 101. When the substrate 101 is formed of a plastic material, water (or moisture) may penetrate into the substrate and may penetrate up to a transistor part or a light emitting device layer of an emission part, causing a reduction in performance of the display apparatus. The display apparatus according to an embodiment of the present disclosure may be configured with two substrates such as the first substrate and the second substrate formed of a plastic material, so as to prevent a reduction in performance of the display apparatus. Also, a middle layer (for example, an inorganic layer) between the first substrate and the second substrate may be formed, and thus, the penetration of water (or moisture) into the substrate may be prevented, thereby the reliability of the display apparatus may be enhanced. The middle layer may include an inorganic layer. For example, the middle layer may include a single layer of nitride silicone (SiNx) or oxide silicone (SiOx) or a multilayer thereof, but embodiments of the present disclosure are not limited thereto. For example, the substrate may have a multi-layer structure where a first polyimide film, an inorganic film, and a second polyimide film are sequentially stacked or formed.

The display apparatus (for example, the display panel thereof) disposed on the substrate 101 may include a plurality of regions. Herein, the display area AA and the non-display area NA may be provided, but embodiments of the present disclosure are not limited thereto.

A transistor part 1000, an emission part 2000, an encapsulation part 3000, and a touch part 4000 may be disposed on the substrate 101, but embodiments of the present disclosure are not limited thereto.

A first buffer layer (or a buffer layer) may be disposed on one side of the display area AA and the non-display area NA on the substrate 101. In the first buffer layer, the buffer layer (or the first buffer layer) including a single layer of SiNx or SiOx or a multilayer thereof may be provided. The buffer layer may enhance an adhesive force between the substrate 101 and layers formed on the buffer layer and may prevent the occurrence of various kinds of defects such as an alkali component leaked from the substrate 101. The buffer layer may delay the diffusion of water (or moisture) or oxygen penetrating into the substrate 101. The buffer layer may be omitted based on the kind and material of the substrate and the structure and type of a TFT.

A plurality of transistor parts 1000 may be disposed on the substrate 101 and/or the buffer layer and in the display area AA and the non-display area NA. The transistors of the display area AA may include a switching transistor or a driving transistor for driving of a subpixel. The transistor of the non-display area NA may include a gate driver, and for example, may include a transistor or an emission transistor for driving of a GIP.

Referring to FIG. 2, a first driving transistor Tr_R, a second driving transistor Tr_G, and a third driving transistor Tr_B of red (R), green (G), and blue (B) subpixels may be provided in the display area AA.

Each of the first driving transistor Tr_R, the second driving transistor Tr_G, and the third driving transistor Tr_B may include a semiconductor layer 110, a gate electrode 120, a source electrode 130S, and a drain electrode 130D on the substrate 101 or the buffer layer. The semiconductor layer 110 may be formed of metal oxide or low temperature poly-silicone (LTPS) formed of polycrystalline silicone. For example, the metal oxide may include one or more of indium-gallium-zinc-oxide (IGZO), indium-zinc-oxide (IZO), indium-gallium-tin-oxide (IGTO), and indium-gallium-oxide (IGO).

A semiconductor layer formed of low temperature poly-silicone (LTPS) may configure a channel region and a source region or a drain region connected with a source electrode or a drain electrode, by electron injection doping.

The metal oxide may be enhanced in conductive characteristic through a doping process of implanting impurities and may include a channel region where a channel enabling the movement of electrons or holes is provided.

A first insulation layer 12 may be disposed on the semiconductor layer 110. The first insulation layer 12 may be disposed between the semiconductor layer 110 and a gate electrode 120, and thus, may insulate the semiconductor layer 110 from the gate electrode 120. The first insulation layer 12 may be a gate insulation layer, but embodiments of the present disclosure are not limited thereto.

The first insulation layer 12 may be formed of an insulating inorganic material such as SiNx or SiOx, but embodiments of the present disclosure are not limited thereto. For example, the first insulation layer 12 may be formed of an insulating organic material.

The gate electrode 120 may be disposed to overlap the semiconductor layer 110. The gate electrode 120 may include a single layer or a multilayer including one or an alloy of silver (Ag), molybdenum (Mo), copper (Cu), titanium (Ti), aluminum (Al), chromium (Cr), gold (Au), nickel (Ni), neodymium (Nd), and tungsten (W), but embodiments of the present disclosure are not limited thereto.

A second insulation layer 13 may be disposed on the gate electrode 120. The second insulation layer 13 may be an interlayer insulation layer, but embodiments of the present disclosure are not limited thereto.

The second insulation layer 13 may be formed of an insulating inorganic material such as SiNx or SiOx, but embodiments of the present disclosure are not limited thereto. For example, the second insulation layer 13 may be formed of an insulating organic material.

A source electrode 130S and a drain electrode 130D may be disposed on the second insulation layer 13. The source electrode 130S and the drain electrode 130D may be connected with the semiconductor layer 110.

The source electrode 130S and the drain electrode 130D may be formed through the same process. The source electrode 130S and the drain electrode 130D may be formed of one or more materials of Ag, Mo, Cu, Ti, Al, Cr, Au, Ni, Nd, and W, but embodiments of the present disclosure are not limited thereto. As another example, each of the source electrode 130S and the drain electrode 130D may include two or more layers which include a first layer including Ti and a second layer including one or more materials of Mo, Cu, Al, Ag, Cr, Au, Nd, and Ni, but embodiments of the present disclosure are not limited thereto.

In forming the source electrode 130S and the drain electrode 130D, a first line 151 may be formed in the non-display area NA by the same process. As another example, the first line 151 may be formed by a process which differs from that of the source electrode 130S and the drain electrode 130D.

The first line 151 may transfer a low level voltage EVSS, output from a flexible printed circuit board (PCB) (FPCB), to a cathode electrode 230.

A first passivation layer 14 may be disposed on the source electrode 130S and the drain electrode 130D and a portion of the first line 151. The first passivation layer 14 may be a first planarization layer, but embodiments of the present disclosure are not limited thereto.

The first passivation layer 14 may include an insulating inorganic insulation layer formed of a material such as SiNx or SiOx or an organic insulation layer formed of a material such as polyacrylate or polyimide, but embodiments of the present disclosure are not limited thereto.

A connection electrode 140 may be disposed on the first passivation layer 14 and may electrically connect the drain electrode 130D with an anode electrode 210 through a contact hole which is formed in the first passivation layer 14.

The connection electrode 140 may be formed of one or more materials of Ag, Mo, Cu, Ti, Al, Cr, Au, Ni, Nd, and W, but embodiments of the present disclosure are not limited thereto. As another example of the present disclosure, the connection electrode 140 may include two or more layers which include a first layer including Ti and a second layer including one or more materials of Mo, Cu, Al, Ag, Cr, Au, Nd, and Ni, but embodiments of the present disclosure are not limited thereto.

A second line 152 may be provided in the non-display area NA by the same process as a process of forming the connection electrode 140. The second line 152 may be connected with the first line 151 and may be used as an auxiliary electrode which transfers a voltage to the cathode electrode 230.

A second passivation layer 15 may be disposed on the connection electrode 140 and a portion of the second line 152. The second passivation layer 15 may be a second planarization layer, but embodiments of the present disclosure are not limited thereto.

The second passivation layer 15 may include an organic insulation layer, and thus, may decrease a step height caused by lines and contact holes formed under the second passivation layer 15. For example, the organic insulation layer may be formed of polyacrylate or polyimide, but embodiments of the present disclosure are not limited thereto.

The emission part 2000 may be disposed on the transistor part 1000. For example, the emission part 2000 may be disposed on the second passivation layer 15 of the display area AA. The emission part 2000 may include the anode electrode 210, a light emitting device layer 220, and the cathode electrode 230.

The anode electrode 210 may be electrically connected with the drain electrode 130D of the driving transistor through the connection electrode 140. The anode electrode 210 may be formed of one or more of Ag, Al, Au, Mo, W, Cr, lead (Pb), indium tin oxide (ITO), and indium zinc oxide (IZO), or an alloy thereof, but embodiments of the present disclosure are not limited thereto.

A third line 153 may be provided in the non-display area NA by the same process as a process of forming the anode electrode 210. As another example of the present disclosure, the third line 153 may be formed by a process different from that of the anode electrode 210.

The third line 153 may be connected with the second line 152 and the first line 151 and may be an auxiliary electrode which transfers a voltage to the cathode electrode 230, but embodiments of the present disclosure are not limited thereto. As another example of the present disclosure, at least one of the second line 152 and the third line 153 may be omitted.

A bank 21 may be disposed on the anode electrode 210 and a portion of the third line 153.

The bank 21 may divide a plurality of subpixels, minimize the spread of light, and prevent the occurrence of color mixture in various viewing angles. The bank 21 may expose a portion of the anode electrode 210 corresponding to an emission region and may overlap an end portion (or a portion) of the anode electrode 210. The bank 21 may overlap a contact hole, formed in the second insulation layer 13 and the first passivation layer 14, and a contact hole formed in the second passivation layer 15.

The bank 21 may be formed of one or more materials of an inorganic insulating material such as SiNx or SiOx and an organic insulating material such as benzocyclobutene (BCB), acryl resin, epoxy resin, phenolic resin, polyamide resin, or polyimide resin, but embodiments of the present disclosure are not limited thereto. As another example, the bank 21 may include a black bank to which a black pigment is added, so as to reduce the reflection of light, but embodiments of the present disclosure are not limited thereto.

A spacer 22 may be further provided on the bank 21. The spacer 22 may decrease an empty space between an upper substrate and the substrate 101 with the light emitting device layer 220 formed therein to minimize the damage of the display apparatus caused by an external impact. The spacer 220 may be formed of the same material as that of the bank 21 and may be formed simultaneously with the bank 21, but embodiments of the present disclosure are not limited thereto.

The light emitting device layer 220 may be disposed over an opening portion of the bank 21 exposing the anode electrode 210. The light emitting device layer 220 may include one or more of a red emission layer, a green emission layer, a blue emission layer, and a white emission layer, so as to emit light having a specific color, but embodiments of the present disclosure are not limited thereto.

When the light emitting device layer 220 includes a white organic emission layer, the light emitting device layer 220 may be disposed all over the opening portion of the bank 21 and the substrate.

The cathode electrode 230 may be disposed on the light emitting device layer 220. The cathode electrode 230 may supply an electron to the light emitting device layer 220. For example, the cathode electrode 230 may include a conductive material which is low in work function, but embodiments of the present disclosure are not limited thereto.

When the display apparatus is a top emission type display apparatus, the cathode electrode 230 may be disposed by a transparent conductive material which transmits light. For example, the cathode electrode 230 may include one or more of ITO and IZO, but embodiments of the present disclosure are not limited thereto.

For example, the cathode electrode 230 may be formed of a semitransparent conductive material which transmits light. For example, the cathode electrode 230 may be formed of one or more of alloys such as LiF/Al, CsF/Al, Mg:Ag, Ca/Ag, Ca:Ag, LiF/Mg:Ag, LiF/Ca/Ag, and LiF/Ca:Ag, but embodiments of the present disclosure are not limited thereto.

When the display apparatus is a bottom emission type display apparatus, the cathode electrode 230 may be a reflection electrode which reflects light and may be disposed by using a semitransparent conductive material. For example, the cathode electrode 230 may be formed of one or more of Ag, Al, Au, Mo, W, and Cr, or an alloy thereof, but embodiments of the present disclosure are not limited thereto.

The light emitting device layer 220 may further include a hole injection layer, a hole transport layer, an electron transport layer, and an electron injection layer, in addition to an emission layer, but embodiments of the present disclosure are not limited thereto.

For example, the light emitting device layer 220 may be stacked and formed on the anode electrode 210 in the order of a hole transfer layer, an emission layer, and an electron transfer layer or the reverse order thereof. For example, the hole transfer layer may be a layer which injects or transfers a hole into or to the emission layer. For example, the hole transfer layer may be a hole injection layer, a hole transport layer, and an electron blocking layer, but embodiments of the present disclosure are not limited thereto. The electron transfer layer may be a layer which injects or transfers an electron into or to the emission layer. For example, the electron transfer layer may be an electron transport layer, an electron injection layer, and a hole blocking layer, but embodiments of the present disclosure are not limited thereto.

The light emitting device layer 220 may include one emission part. The one emission part may include a red emission layer, a green emission layer, and a blue emission layer, which respectively emit red light, green light, and blue light by subpixels PXL.

The light emitting device layer 220 may include two or more emission parts. The emission part may be referred to as a stack, but the terms are not limited thereto. The two or more emission parts may include a first emission part and a second emission part. The first emission part and the second emission part may include a red emission layer, a green emission layer, and a blue emission layer, which respectively emit red light, green light, and blue light by subpixels. Two or more emission layers included in the first emission part and the second emission part may be emission layers which emit lights having the same color. As another example of the present disclosure, a first emission layer included in the first emission part may include a blue emission layer, a sky blue emission layer, a deep blue emission layer, a combination of a blue emission layer and a red emission layer, a combination of a sky blue emission layer and a red emission layer, and a combination of a deep blue emission layer and a red emission layer, but embodiments of the present disclosure are not limited thereto. For example, a first emission layer included in the first emission part may include a yellow emission layer, a yellow-green emission layer, a green emission layer, a combination of a yellow emission layer and a red emission layer, a combination of a yellow-green emission layer and a red emission layer, a combination of a green emission layer and a red emission layer, a combination of a yellow emission layer, a yellow-green emission layer, and a green emission layer, a combination of a yellow emission layer, a yellow-green emission layer, a green emission layer, and a red emission layer, a combination of two yellow-green emission layers and one green emission layer, a combination of one yellow-green emission layer and two green emission layers, a combination of two yellow-green emission layers, one green emission layer, and a red emission layer, or a combination of one yellow-green emission layer, two green emission layers, and a red emission layer, but embodiments of the present disclosure are not limited thereto. A charge generating layer may be provided between the first emission part and the second emission part. The charge generating layer may include an n-type charge generating layer and a p-type charge generating layer. Each of the first emission part and the second emission part may include one or more of a hole injection layer, a hole transport layer, a hole blocking layer, an electron blocking layer, an electron transport layer, and an electron injection layer, but embodiments of the present disclosure are not limited thereto.

The two or more emission parts may include a first emission part, a second emission part, and a third emission part. A first emission layer included in the first emission part may be the same as the above description. A second emission layer included in the second emission part may be the same as the above description. A third emission layer included in the third emission part may be configured to be equal to the first emission layer, but embodiments of the present disclosure are not limited thereto. A first charge generating layer may be provided between the first emission part and the second emission part. The first charge generating layer may include an n-type charge generating layer and a p-type charge generating layer. A second charge generating layer may be provided between the second emission part and the third emission part. The second charge generating layer may include an n-type charge generating layer and a p-type charge generating layer. Each of the first emission part, the second emission part, and the third emission part may include one or more of a hole injection layer, a hole transport layer, a hole blocking layer, an electron blocking layer, an electron transport layer, and an electron injection layer, but embodiments of the present disclosure are not limited thereto.

The two or more emission parts may include a first emission part, a second emission part, a third emission part, and a fourth emission part. Two or more emission layers of the first emission part, the second emission part, the third emission part, and the fourth emission part may be configured as emission layers which emit lights having the same color. For example, two or more emission layers of the first emission part, the second emission part, the third emission part, and the fourth emission part may be configured as blue emission layers, but embodiments of the present disclosure are not limited thereto. One or more emission layers of the first emission part, the second emission part, the third emission part, and the fourth emission part may include a blue emission layer and an emission layer different from the blue emission layer. For example, one or more emission layers of the first emission part, the second emission part, the third emission part, and the fourth emission part may include a yellow emission layer, a yellow-green emission layer, a green emission layer, a combination of a yellow emission layer and a red emission layer, a combination of a yellow-green emission layer and a red emission layer, a combination of a green emission layer and a red emission layer, a combination of a yellow emission layer, a yellow-green emission layer, and a green emission layer, a combination of a yellow emission layer, a yellow-green emission layer, a green emission layer, and a red emission layer, a combination of two yellow-green emission layers and one green emission layer, a combination of one yellow-green emission layer and two green emission layers, a combination of two yellow-green emission layers, one green emission layer, and a red emission layer, or a combination of one yellow-green emission layer, two green emission layers, and a red emission layer, but embodiments of the present disclosure are not limited thereto. A first charge generating layer may be provided between the first emission part and the second emission part. The first charge generating layer may include an n-type charge generating layer and a p-type charge generating layer. A second charge generating layer may be provided between the second emission part and the third emission part. The second charge generating layer may include an n-type charge generating layer and a p-type charge generating layer. A third charge generating layer may be provided between the third emission part and the fourth emission part. The third charge generating layer may include an n-type charge generating layer and a p-type charge generating layer. Each of the first emission part, the second emission part, the third emission part, and the fourth emission part may include one or more of a hole injection layer, a hole transport layer, a hole blocking layer, an electron blocking layer, an electron transport layer, and an electron injection layer, but embodiments of the present disclosure are not limited thereto.

A driving circuit part and a dam part where a plurality of dams are provided may be disposed in an end portion of the non-display area NA of the display apparatus. The end portion of the non-display area NA may be a region where the display apparatus is sealed by a connection part electrically connected with the cathode electrode 230 and an EVSS line, the encapsulation layer (or encapsulation part), and the plurality of dams. The first insulation layer 12, the second insulation layer 13, the first passivation layer 14, and the second passivation layer 15 disposed on the substrate 101 may be disposed to extend in the end portion.

Lines may be disposed in the end portion so that touch signals and a source voltage applied from the flexible printed circuit board (FPCB) of the display apparatus are connected with one another through the lines.

The plurality of dams may be disposed in the end portion of the non-display area NA. To prevent the second encapsulation layer 320 including an organic layer among the plurality of dams from be leaked to the outside, one or more insulation layers may be stacked and formed, but embodiments of the present disclosure are not limited thereto.

The plurality of dams may include a first dam 161, a second dam 162, and a third dam 163 and may include at least two dams, but the number of dams is not limited thereto. Each of the first dam 161, the second dam 162, and the third dam 163 may surround the display area AA.

The first dam 161, the second dam 162, and the third dam 163 may respectively have a first height, a second height, and a third height. For example, the second height may be higher than the first height, and the third height may be lower than the second height.

Even when the second encapsulation layer 320 passes over the first dam 161, the second dam 162 may prevent the second encapsulation layer 320 from being leaked to the outside.

The first dam 161, the second dam 162, and the third dam 163 may be configured with the first passivation layer 14, the second passivation layer 15, the bank 21, and the spacer 22.

The first line 151 may be disposed under the second passivation layer 15 configuring the first dam 161 and the first passivation layer 14 configuring the second dam 162. The second line 152 may be disposed under the bank 21 and the second passivation layer 15 configuring the first dam 161. The third line 153 may be disposed under the bank 21 of the first dam 161.

The first line 151, the second line 152, and the third line 153 may contact and be electrically connected with one another in a region between the first dam 161 and the second dam 162 and may transfer a voltage to the cathode electrode 230.

The first line 151, the second line 152, and the third line 153 may be disposed to overlap a portion of a gate driver of the driving circuit part. For example, the gate driver may be a GIP, but embodiments of the present disclosure are not limited thereto.

A capping layer may be disposed on the cathode electrode 230. The capping layer may protect the cathode electrode 230 and may enhance external light efficiency. For example, the capping layer may include an organic or inorganic layer. For example, the capping layer may include a metal material such as lithium fluoride (LiF) and may further include an organic layer, but embodiments of the present disclosure are not limited thereto.

The encapsulation part 3000 may be disposed on the emission part 2000. For example, the encapsulation part 3000 may be disposed on the cathode electrode 230 and the capping layer. The encapsulation part 3000 may protect the display apparatus from external water (or moisture), oxygen, and particles. For example, the encapsulation part 3000 may prevent the penetration of external water (or moisture), oxygen, and particles, and thus, oxidation of a light emitting material and an electrode material may be prevented.

The encapsulation part 3000 may include a transparent material, so as to transmit light emitted from the light emitting device layer 220.

The encapsulation part 3000 may include a first encapsulation layer 310, a second encapsulation layer 320, and a third encapsulation layer 330, but embodiments of the present disclosure are not limited thereto. The first encapsulation layer 310, the second encapsulation layer 320, and the third encapsulation layer 330 may have a sequentially stacked structure, but embodiments of the present disclosure are not limited thereto.

The first encapsulation layer 310 and the third encapsulation layer 330 may be formed of one or more materials of SiNx, SiOx, and oxide aluminum (AlyOz), but embodiments of the present disclosure are not limited thereto.

The second encapsulation layer 320 may cover foreign materials or particles occurring in a manufacturing process of the display apparatus. The second encapsulation layer 320 may planarize a surface of the first encapsulation layer 310.

The second encapsulation layer 320 may be formed of an organic material, and for example, may be formed of a polymer such as acrylate, silicone oxycarbon epoxy (SiOCz), epoxy, polyimide, or polyethylene, but embodiments of the present disclosure are not limited thereto.

The touch part 4000 for a touch operation of the display apparatus 100 may be disposed on the third encapsulation layer 330. For example, the touch part 4000 may include a buffer layer 41, a bridge electrode 410, a touch electrode 420, an insulation layer 42, and a passivation layer 43, but embodiments of the present disclosure are not limited thereto. According to another embodiment of the present disclosure, the touch part 4000 may be disposed on a polarization member 710.

For example, in the touch part 4000, the buffer layer (or a second buffer layer) 41 may be disposed on the third encapsulation layer 330. The buffer layer 41 may enhance an adhesive force between the third encapsulation layer 330 and layers formed on the buffer layer 41. The buffer layer 41 may extend up to a region where a connection part between the substrate 101 and the FPCB disposed in the non-display area NA is disposed. The buffer layer 41 may include a single layer of SiNx or SiOx or a multilayer thereof, but embodiments of the present disclosure are not limited thereto.

The bridge electrode 410 may be disposed on the buffer layer 41. The bridge electrode 410 may electrically connect the touch electrodes 420 with one another and may transfer a touch signal. The bridge electrode 410 may include a single layer or a multilayer including one of Ag, Mo, Cu, Ti, Al, Cr, Au, Ni, Nd, and W or an alloy thereof, but embodiments of the present disclosure are not limited thereto.

The third insulation layer 42 may be disposed on the bridge electrode 410. The third insulation layer 42 may connect the touch electrodes 420 with the bridge electrode 410 through a contact hole formed in the third insulation layer 42. For example, the third insulation layer 42 may be an insulation layer disposed in the touch part 4000, and thus, may be a touch insulation layer, but embodiments of the present disclosure are not limited thereto. For example, the third insulation layer 42 may include a single layer of SiNx or SiOx or a multilayer thereof, but embodiments of the present disclosure are not limited thereto.

The touch electrode 420 may be disposed on the third insulation layer 42. The touch electrode 420 may be connected with a plurality of touch lines disposed in the non-display area NA and may be connected with a touch circuit of the FPCB.

The touch circuit may supply a touch driving signal to the touch electrode 420 so as to execute a touch operation, detect a touch sensing signal from the touch electrode 420, and sense the presence of a touch and/or a touch position (coordinates), based on the detected touch sensing signal.

The touch electrode 420 may include a single layer or a multilayer including one of Ag, Mo, Cu, Ti, Al, Cr, Au, Ni, Nd, and W or an alloy thereof, but embodiments of the present disclosure are not limited thereto. For example, the touch electrode 420 and the bridge electrode 410 may be disposed at positions corresponding to the bank 21 and the spacer 22.

The third passivation layer 43 may be disposed on the touch electrode 420. The third passivation layer 43 may extend up to the region where the connection part between the substrate 101 and the FPCB disposed in the non-display area NA is disposed.

The third passivation layer 43 may include one or more materials of an inorganic insulating material such as SiNx or SiOx and an organic insulating material such as BCB, acryl resin, epoxy resin, phenolic resin, polyamide resin, or polyimide resin, but embodiments of the present disclosure are not limited thereto.

The polarization member 710 may be disposed on the third passivation layer 43. For example, the polarization member 710 may be an optical control layer, but the terms are not limited thereto. The polarization member 710 may prevent light incident from the outside of the display panel from being reflected by the cathode electrode 230 between subpixels PX, thereby enhancing the visibility of the display apparatus.

A lower adhesive member (or a first adhesive member) 901 may be disposed between the third passivation layer 43 and the polarization member 710. A cover member 720 may be disposed on the polarization member 710. For example, the first cover member 720 may be a cover window or a window cover, but the terms are not limited thereto. An upper adhesive member (or a second adhesive member) 903 may be disposed between the polarization member 710 and the first cover member 720.

FIGS. 3A to 3E are perspective views illustrating a display apparatus according to an embodiment of the present disclosure.

Referring to FIGS. 3A to 3E, the display apparatus 100 (for example, the display panel thereof) according to an embodiment of the present disclosure may include a display area AA, a non-display area NA, and a hole region HA.

The display area AA may be an area which displays an image. The non-display area NA may be a region which is disposed at an edge (or a periphery) of the display area AA and does not display an image.

The display apparatus 100 may include a variable region VA and non-variable regions (or invariable regions), for example, a first non-variable region NVA1 and a second non-variable region NVA2, based on the presence of variation. For example, variable may include foldable, bendable, and flexible, but embodiments of the present disclosure are not limited thereto. For example, variable may include a structure which is fully folded and a structure which is bendable by several μm or nm (nanometer). For example, the display apparatus 100 may include the variable region VA and the non-variable regions (for example, the first non-variable region NVA1 and the second non-variable region NVA2), based on the presence of folding or bending. The display apparatus 100 may include a foldable display apparatus, a bendable display apparatus, a curved display apparatus, a variable display apparatus, or a flexible display apparatus, but embodiments of the present disclosure are not limited thereto. Here, an example where the display apparatus 100 is a foldable apparatus is described, but embodiments of the present disclosure are not limited thereto.

The variable region VA may be a region which is folded when the display apparatus 100 is folded. For example, the variable region VA may be a folding region. For example, the variable region VA may be folded based on a certain curvature radius with respect to a folding axis Fx. For example, the folding axis Fx of the variable region VA may be formed in an X-axis direction, and the non-variable regions (for example, the first non-variable region NVA1 and the second non-variable region NVA2) may extend from the variable region VA in a Y-axis direction perpendicular to the folding axis Fx. When the variable region VA is folded with respect to the folding axis Fx, the variable region VA may configure a portion of a circle or an oval. A curvature radius of the variable region VA may be a radius of a circle or an oval formed by the variable region VA, but embodiments of the present disclosure are not limited thereto.

Each of the non-variable regions (for example, the first non-variable region NVA1 and the second non-variable region NVA2) may be a region which is not folded when the display apparatus 100 is folded. For example, the non-variable regions (for example, the first non-variable region NVA1 and the second non-variable region NVA2) may maintain a flat state when the display apparatus 100 is folded. The non-variable regions NVA1 and NVA2 may be disposed at both sides (or both portions) of the variable region VA, but embodiments of the present disclosure are not limited thereto. For example, the non-variable regions (for example, the first non-variable region NVA1 and the second non-variable region NVA2) may be a region which extends in the Y-axis direction with respect to the folding axis Fx. In this case, the variable region VA may be between the non-variable regions (for example, the first non-variable region NVA1 and the second non-variable region NVA2). For example, when the display apparatus 100 is folded with respect to the folding axis Fx, the non-variable regions (for example, the first non-variable region NVA1 and the second non-variable region NVA2) may overlap each other. For example, the non-variable regions (for example, the first non-variable region NVA1 and the second non-variable region NVA2) may overlap a portion of the display area AA and a portion of the non-display area NA.

For example, when it is assumed that an upper surface displaying an image is a display surface in the display apparatus 100 and a lower surface, which is a surface opposite to the display surface, of the display apparatus 100 is a rear surface, the variable region VA may be folded by one of outer folding where the variable region VA is folded so that the display surface of the display apparatus 100 is exposed at the outside and inner folding where the variable region VA is folded so that the display surface of the display apparatus 100 faces each other, but embodiments of the present disclosure are not limited thereto.

For example, the variable region VA may be a region which is bent at a certain curvature when the display apparatus 100 is folded by at least one of inner folding and outer folding. A region except the non-variable regions (for example, the first non-variable region NVA1 and the second non-variable region NVA2) may be the variable region VA.

The display apparatus 100 may further include a hinge structure for folding the display panel and a housing (or casing) which supports and accommodates the display panel. The variable region (for example, the first non-variable region VA and the non-variable regions NVA1 and the second non-variable region NVA2) may be identically applied to the elements of the display apparatus 100.

Referring to FIGS. 3A to 3E, the display apparatus 100 may include a first housing 41 and a second housing 42. The first housing 41 and the second housing 42 may be coupled to and rotatably connected with each other. For example, a connection member 45 may be provided at a lateral surface of the first housing 41. A connection member (for example, hinge) 45 may be provided at a lateral surface of the second housing 42. A hinge 45 provided at the lateral surface of the first housing 41 may be coupled to and rotatably connected with the connection member 45 provided at the lateral surface of the second housing 42. The connection member 45 may include a hinge, but embodiments of the present disclosure are not limited thereto. According to another embodiment of the present disclosure, the connection member 45 may be provided as one piece (in other words, integrally formed) in the first housing 41 and the second housing 42.

Figure 3A:
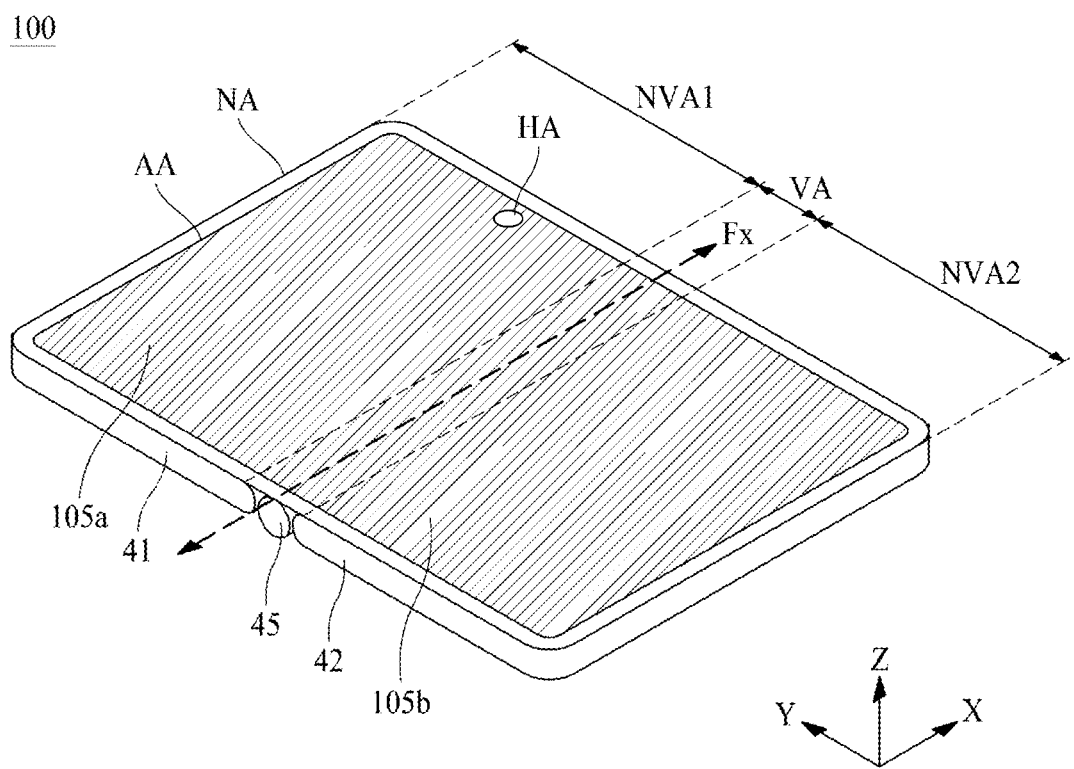
FIGS. 3A to 3E are perspective views illustrating a display apparatus according to an embodiment of the present disclosure.
Figure 3B:
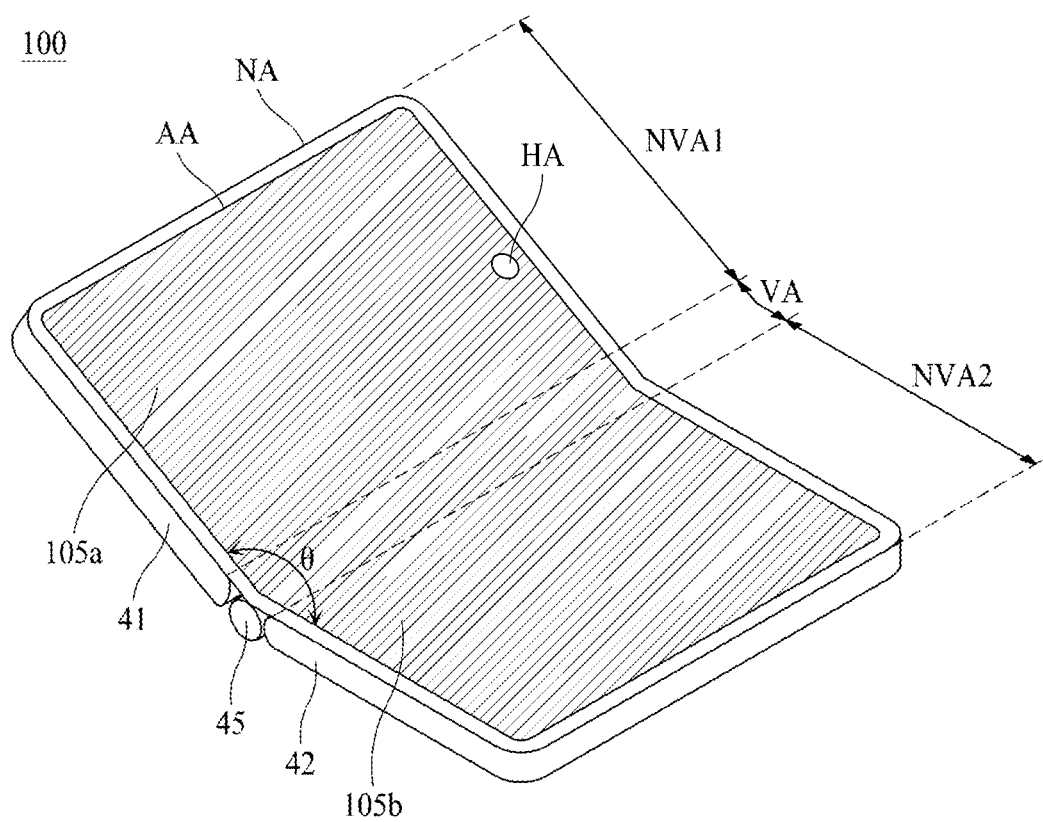
Figure 3C:
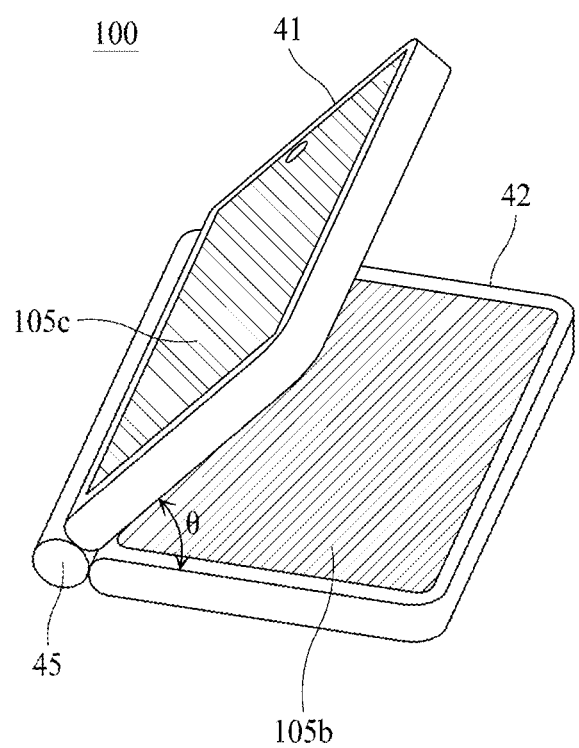
Figure 3D:
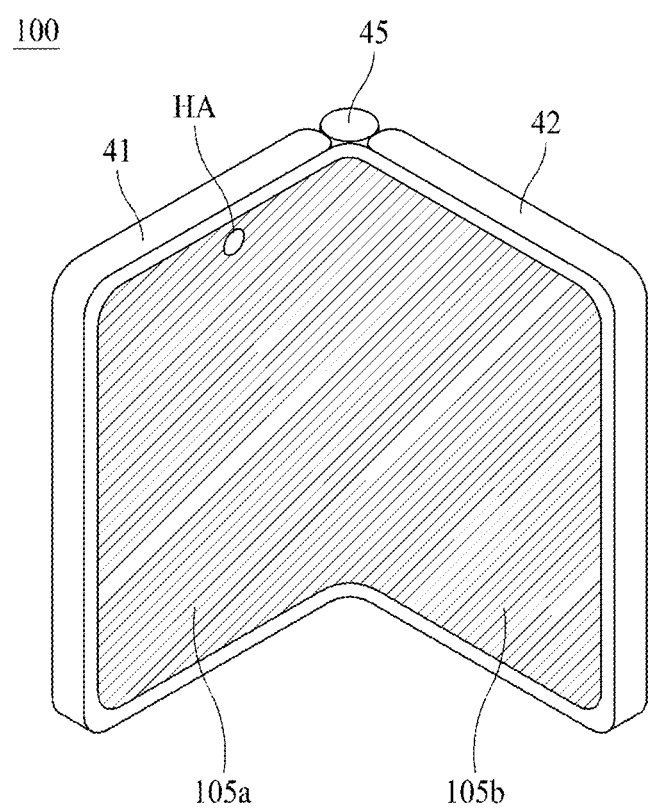

Referring to FIGS. 3B and 3D, a method where a first display surface 105a and a second display surface 105b of the display apparatus 100 are folded to face each other is illustrated. For example, the display apparatus 100 may have an unfolded state where the display apparatus 100 is unfolded so that a lower surface of the first housing 41 and an upper surface of the second housing 42 are located on one plane with respect to the connection member 45.

Figure 3E:
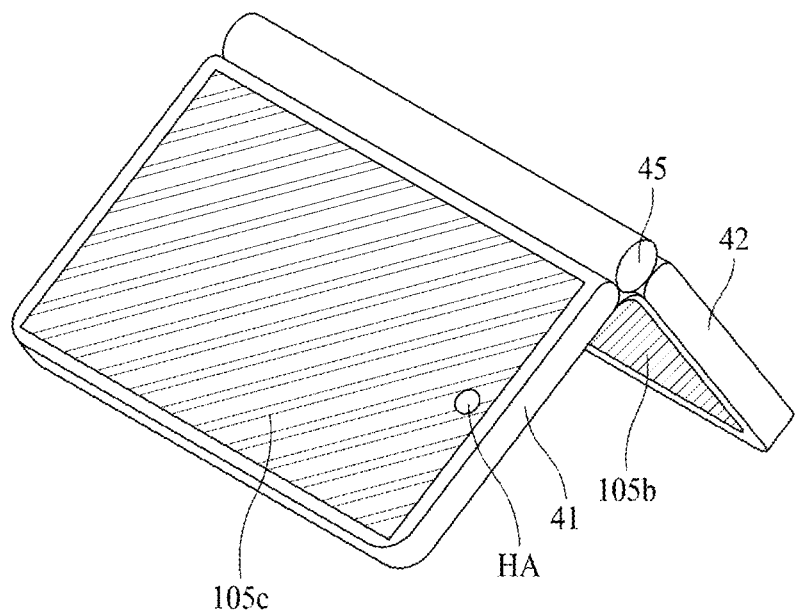

Referring to FIGS. 3C and 3E, the display apparatus 100 may have a folded state where the first housing 41 faces the second housing 42 with respect to the connection member 45, and an unfolded state is illustrated where the first housing 41 and the second housing 42 are unfolded by a certain angle. An angle θ between the first housing 41 and the second housing 42 may be a right angle or an obtuse angle, but embodiments of the present disclosure are not limited thereto.

A third display surface 105c corresponding to the display area AA may be exposed at the outside in state where the display apparatus 100 is folded. For example, the display apparatus 100 may activate the display area AA corresponding to the third display surface 105c in state where the display apparatus 100 is folded. The second display surface 105b may be deactivated. Activation may denote an operation of displaying a screen corresponding to the display area AA. Alternatively, activation may denote an operation of displaying a screen on a partial region of the display area AA. Alternatively, activation may denote an operation of supplying power to a subpixel or a pixel corresponding to the display area AA on which a screen is to be displayed. Alternatively, activation may denote an operation of changing a sleep state to an active state. The display area AA corresponding to an edge (or a periphery) of the first housing 41 and an edge (or a periphery) of the second housing 42 may be deactivated. Deactivation may denote an operation of turning off a screen corresponding to the display area AA. Alternatively, deactivation may denote an operation which does not supply power to a subpixel or a pixel corresponding to the display area AA on which a screen is to be displayed. Alternatively, deactivation may denote an operation of changing the active state to the sleep state.

According to another embodiment of the present disclosure, the third display surface 105c corresponding to the display area AA may be exposed at the outside in state where the display apparatus 100 is folded. For example, the display apparatus 100 may activate the display area AA corresponding to the third display surface 105c in state where the display apparatus 100 is folded. The display area AA corresponding to the third display surface 105c may be activated in a state where the display apparatus 100 is folded. The second display surface 105b may be activated in a state where the display apparatus 100 is unfolded. The second display surface 105b and the third display surface 105c may be cooperated with each other and may display as one and the same display surface, but embodiments of the present disclosure are not limited thereto.

Figure 4A:
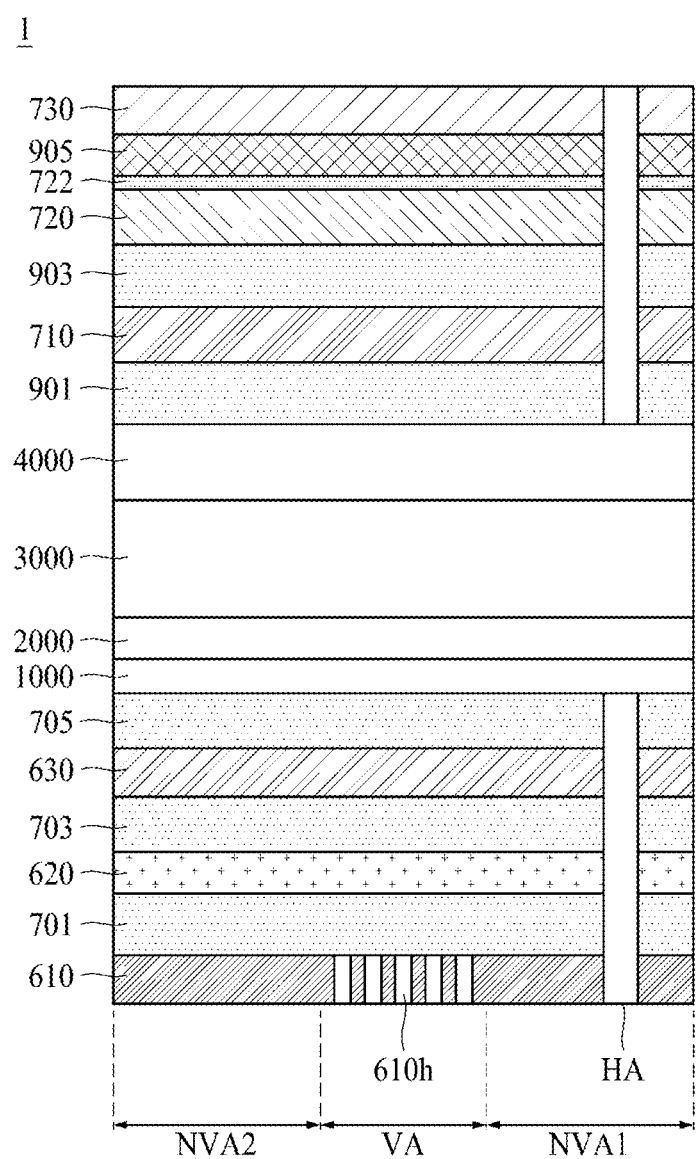
FIG. 4A illustrates a display apparatus according to an embodiment of the present disclosure.

FIG. 4A illustrates a display apparatus according to an embodiment of the present disclosure.

Referring to FIGS. 2 to 4A, a display apparatus 1 (or 100) or a display panel 102 according to an embodiment of the present disclosure may include a transistor part 1000, an emission part 2000, an encapsulation part 3000, and a touch part 4000.

The transistor part 1000 may be disposed on a substrate 101. The emission part 2000 may be disposed on the transistor part 1000. The encapsulation part 3000 may be disposed on the emission part 2000. The touch part 4000 may be disposed on the encapsulation part 3000. The transistor part 1000, the emission part 2000, the encapsulation part 3000, and the touch part 4000 may be substantially the same as the descriptions of FIG. 2, and thus, descriptions thereof are omitted or will be briefly given below. The display panel 102 may include the transistor part 1000, the emission part 2000, the encapsulation part 3000, and the touch part 4000, but embodiments of the present disclosure are not limited thereto.

In folding or bending the display apparatus 1, the display panel having flexibility may be difficult to maintain a shape of the display panel as a certain shape and may be vulnerable to an external impact. Therefore, various kinds of supporting members may be disposed on a rear surface of the transistor part 1000 or the display panel. For example, one or more plates may be disposed under the transistor part 1000 or the display panel. For example, the one or more plates may be provided under the transistor part 1000 or the display panel. For example, the one or more plates may include a first plate 610, a second plate 620, and a third plate 630, but embodiments of the present disclosure are not limited thereto. For example, the transistor part 1000 may be disposed on the one or more plates.

For example, when the substrate 101 including a plastic material is applied, a thickness of the substrate 101 may be thin, and thus, sagging of the display panel may occur in folding or bending. To compensate for the sagging of the display panel, the third plate 630 may be disposed at the rear surface of the display panel or the transistor part 1000. For example, the third plate 630 may be formed of polyimide, but embodiments of the present disclosure are not limited thereto. For example, the third plate 630 may be a back plate or a supporting plate, but the terms are not limited thereto.

The first plate 610 may reinforce a stiffness of the second plate 620 and the substrate 101 including a plastic material. The first plate 610 may be formed of metal which is good in thermal conductivity. For example, the first plate 610 may be formed of a metal material such as stainless steel (SUS), carbon fiber reinforced plastics (CFRP), invar (an alloy of iron (Fe) and nickel (Ni)), Al, or magnesium (Mg), but embodiments of the present disclosure are not limited thereto. For example, the metal material may be higher in stiffness than a plastic material, and thus, the durability of the display apparatus 1 may be further enhanced.

The first plate 610 may include one or more opening patterns (or opening portions) 610*h*. For example, the one or more opening patterns 610*h* may correspond to the variable region VA of the display apparatus 1. The one or more opening patterns 610*h* may enable the first plate 610 of the variable region VA to be easily folded and may effectively reduce a stress applied to the first plate 610 in folding. Also, by facilitating restoration after folding, a folding characteristic of the display apparatus 1 may be enhanced.

The one or more opening patterns 610*h* may extend in a direction parallel to a folding axis Fx and may be configured in a discontinuous shape. A length of each of the one or more opening patterns 610*h* may be shorter than a width of the first plate 610 in a direction of the folding axis Fx. The shape and arrangement of the one or more opening patterns 610*h* are not limited to the illustration. Intervals between two or more opening patterns 610*h* adjacent to one another in a direction perpendicular to the folding axis Fx may be constant, but embodiments of the present disclosure are not limited thereto. For example, the two or more opening patterns 610*h* may be configured in a certain shape, but embodiments of the present disclosure are not limited thereto. For example, the two or more opening patterns 610*h* may be formed in different shapes or at different intervals (or distances) in the variable region VA, but embodiments of the present disclosure are not limited thereto. For example, intervals between two or more opening patterns 610*h* adjacent to one another in a direction perpendicular to the folding axis Fx may increase progressively in a direction distancing or away from the folding axis Fx. The two or more opening patterns 610*h* adjacent to one another in a direction perpendicular to the folding axis Fx may have a first interval (or a first distance) at a center portion adjacent to the folding axis Fx and a second interval (or a second distance), which is greater than the first interval, at both edge portions (or both periphery portions) of the center portion. For example, the one or more opening patterns 610*h* may have an oblong shape, a rectangular shape, a rhombus (or a diamond) shape, or a circular shape, but embodiments of the present disclosure are not limited thereto.

The second plate 620 may be disposed on the first plate 610. For example, the second plate 620 may reinforce a stiffness of the display panel and/or the transistor part 1000. For example, the second plate 620 may be formed of SUS, CFRP, invar, Al, Mg, or the like, but embodiments of the present disclosure are not limited thereto. As another example of the present disclosure, the second plate 620 may be formed of a material which differs from that of the first plate 610. For example, the second plate 620 may include a polymer which blocks ultraviolet (UV). For example, the second plate 620 may include polyethylene terephthalate (PET) having a black color, but embodiments of the present disclosure are not limited thereto. The first plate 610 may be a lower plate and the second plate 620 may be an upper plate, but the terms are not limited thereto.

One or more adhesive members may be disposed in the display area AA. For example, one or more adhesive members may be disposed between one or more plates. For example, the two or more adhesive members may include a first adhesive member 701, a second adhesive member 703, and a third adhesive member 705, but embodiments of the present disclosure are not limited thereto. The first adhesive member 701 may be disposed between the first plate 610 and the second plate 620. The second adhesive member 703 may be disposed between the second plate 620 and the third plate 630. The third adhesive member 705 may be disposed between the third plate 630 and the transistor part 1000. For example, the first adhesive member 701 may cover the one or more opening patterns 610*h* of the first plate 610. For example, the first to third adhesive members 701, 703, and 705 may be one or more fifth adhesive members, but the terms are not limited thereto.

The first adhesive member 701, the second adhesive member 703, and the third adhesive member 705 may include an optically cleared adhesive (OCA), an optically cleared resin (OCR), and a pressure sensitive adhesive (PSA) or the like.

Referring to FIG. 4A, a polarization member 710 may be disposed on the encapsulation part 4000. One or more cover member may be disposed on the polarization member 710. The one or more cover members may include a first cover member 720 and a second cover member 730, but embodiments of the present disclosure are not limited thereto. For example, the cover member may be a front member, a cover window, or a window cover, but embodiments of the present disclosure are not limited thereto.

Referring to FIG. 4A, the display apparatus 1 according to an embodiment of the present disclosure may include a hole region HA. The hole region HA may be disposed at a periphery of a display area AA. The hole region HA may be disposed at a periphery of a substrate 101.

For example, the hole region HA may be disposed in a portion of the one or more plates and a portion of the one or more cover members. For example, the hole region HA may be disposed in a portion of one or more of the first plate 610, the second plate 620, and the third plate 630 and a portion of one or more of the first cover member 720 and the second cover member 730. For example, a hole region HA in one or more of the first plate 610, the second plate 620, and the third plate 630 may be an empty space. The display apparatus 1 in which the hole region HA of FIG. 4A is disposed may be referred as an under display panel (UDC), but the terms are not limited thereto. For example, a display area of the hole area HA may be provided in a sparse structure and may have a structure which may receive light from the outside by a camera in the hole region HA. For example, one or more of a camera, a sensor, and an optical part (or an optical component) may be disposed in the hole region HA, but embodiments of the present disclosure are not limited thereto. For example, the sensor may include an infrared sensor, but embodiments of the present disclosure are not limited thereto.

According to an embodiment of the present disclosure, the one or more cover members may be disposed on the encapsulation part 4000. For example, the first cover member 720 may be disposed on the encapsulation part 4000. The second cover member 730 may be disposed on the first cover member 720. For example, one or more of the first cover member 720 and the second cover member 730 may protect the display apparatus 1 so that the display apparatus 1 is not damaged by an external impact or the display apparatus 1 and the emission part 2000 are not degraded by water (or moisture), oxygen, or particles flowing in (or entering) from the outside.

One or more of the first cover member 720 and the second cover member 730 may be formed of (or include) a material which is transparent and is good in impact resistance and scratch resistance. For example, one or more of the first cover member 720 and the second cover member 730 may be configured with a film including a polymer such as polyimide (PI), polyamide, polyethylene terephthalate (PET), poly(methylmethacrylate), polyethylene glycol (PEG), or polycarbonate (PC), but embodiments of the present disclosure are not limited thereto. As another example of the present disclosure, one or more of the first cover member 720 and the second cover member 730 may be configured with a film including an optical isotropic polymer such as a cyclo-olefin (co)polymer, optical isotropic polycarbonate, or optical isotropic poly(methylmethacrylate), but embodiments of the present disclosure are not limited thereto. As another example of the present disclosure, one or more of the first cover member 720 and the second cover member 730 may include chemical reinforced thin glass. When the second cover member 730 includes a thin glass, a protection film for preventing scattering may be disposed on the second cover member 730. For example, the first cover member 720 may be a cover window and the second cover member 730 may be a protection film, but embodiments of the present disclosure are not limited thereto.

Referring to FIG. 4A, one or more adhesive members may be disposed in the display area AA. For example, the one or more adhesive members may be disposed between two or more cover members. For example, the one or more adhesive members may be disposed between two or more cover members and may be disposed in the display area AA. The one or more adhesive members may include a lower adhesive member (or a fourth adhesive member) 901 and an upper adhesive member (or a fifth adhesive member) 903, but embodiments of the present disclosure are not limited thereto. For example, the lower adhesive member (or the fourth adhesive member) 901 may be disposed between the encapsulation part 4000 and the polarization member 710. For example, the upper adhesive member (or the fifth adhesive member) 903 may be disposed between the polarization member 710 and the first cover member 720. The lower adhesive member (or the fourth adhesive member) 901 and/or the upper adhesive member (or the fifth adhesive member) 903 may be a first adhesive member, but the terms are not limited thereto. For example, when the first adhesive member 701, the second adhesive member 702, and the third adhesive member 703 are the fifth adhesive member and the fourth adhesive member 901 and/or the fifth adhesive member 903 are/is the first adhesive member, one or more of the first adhesive members may be the same as one or more of the fifth adhesive members. For example, when the first adhesive member 701, the second adhesive member 702, and the third adhesive member 703 are the fifth adhesive member, and the lower adhesive member (or the fourth adhesive member) 901 and/or the lower adhesive member (or the fifth adhesive member) 903 are/is the first adhesive member, one or more of the first adhesive members may include the same material as that of one or more of the fifth adhesive members.

According to an embodiment of the present disclosure, an anti-fingerprint part 722 may be formed on the first cover member 720. For example, the anti-fingerprint part 722 may be formed or coated on the first cover member 720 or may be coated or formed, so as to prevent or remove pollution from a fingerprint. For example, the anti-fingerprint part 722 may include a fluoride compound (or be formed of a fluoride compound), but embodiments of the present disclosure are not limited thereto. For example, the anti-fingerprint part 722 may use a fluoride compound, and thus, may be very low in hydrophilicity. Accordingly, there may be a problem where it is difficult to place a separate protection film on the first cover member 720 with the anti-fingerprint part 722 formed thereon. The protection film may be disposed for preventing the damage or scratch of the display apparatus 1. Even when an adhesive member is provided on the first cover member 720 so as to form the protection film, an adhesive force of the adhesive member may be low due to the anti-fingerprint part 722 having low hydrophilicity, and due to this, there may be a problem where it is difficult to place the protection film. Also, in a case where the protection film is provided on the first cover member 720 with the anti-fingerprint part 722 formed thereon, there may be a problem where the first cover member 720 is detached from the protection film due to low surface energy of the first cover member 720 with the anti-fingerprint part 722 formed thereon. Also, in a case where the protection film is provided on the first cover member 720 with the anti-fingerprint part 722 formed thereon, the protection film should include a soft material so as not to be partially detached in folding. When the protection film includes the soft material, a sense of touch may not be good, and due to this, there may be a problem where a user is difficult to drag. Also, when the protection film includes the soft material, the protection film may be stretched due to elasticity of the material in performing attachment, or indentation by a nail or a pen may occur due to low hardness, and there may be a problem where a discoloration (or a yellowing) phenomenon occurs where a color is changed.

Moreover, because an adhesive force is affected due to the anti-fingerprint part 722 having low hydrophilicity, an adhesive force may be improved by reducing a characteristic of the anti-fingerprint part 722, but there may be problem where it is difficult to provide a display apparatus having a desired characteristic of the anti-fingerprint part 722.

The present disclosure is directed to placing a cover member such as a protection film on the first cover member 720 with the anti-fingerprint part 722 formed thereon and configuring an adhesive member where an adhesive force is improved. The adhesive member and the cover member such as the protection film are placed on the first cover member 720.

According to an embodiment of the present disclosure, the second cover member 730 may be disposed for preventing the damage or scratch of the display apparatus 1. Therefore, a sixth adhesive member 905 having a low adhesive force (in other words, having a relatively low adhesive force) should be provided so that the second cover member 730 can be attached and/or stripped (or delaminated), due to the damage or scratch of the display apparatus 1. In a case where the sixth adhesive member 905 having a low adhesive force is provided, there may be a problem where the second cover member 730 is detached as folding and/or unfolding of the display apparatus 1 are/is repeated. Accordingly, the present disclosure is directed to a display apparatus including a new adhesive member, in which an adhesive force of the sixth adhesive member 905 is improved, a characteristic of the anti-fingerprint part 722 is improved, and the reliability of the display apparatus is improved. This will be described below.

According to an embodiment of the present disclosure, the sixth adhesive member 905 may include a material which differs from that of the lower adhesive member (or the fourth adhesive member) 901 and/or the upper adhesive member (or the fifth adhesive member) 903. The sixth adhesive member 905 may be a second adhesive member, but the terms are not limited thereto. For example, a shear strain of the sixth adhesive member 905 may differ from a shear strain of the lower adhesive member (or the fourth adhesive member) 901 and/or the upper adhesive member (or the fifth adhesive member) 903. For example, the shear strain of the sixth adhesive member 905 may be higher than the shear strain of the lower adhesive member (or the fourth adhesive member) 901 and/or the upper adhesive member (or the fifth adhesive member) 903. The shear strain may be an action or a parameter where a force is applied to an object in directions opposite to each other in parallel to a cross-sectional direction. For example, when a shear strain of an adhesive member is high, an adhesive force of the adhesive member may increase. In an adhesive member where a shear strain is high, many strains may occur with respect to a shear direction, a time at which stripping (or delamination) occurs may be delayed, and a force occurring when the shear strain of the adhesive member occurs may be accumulated or increase, causing an increase in adhesive force of the adhesive member. According to an embodiment of the present disclosure, because the sixth adhesive member 905 is configured to have a high shear strain, a shear adhesive force may increase, and thus, an adhesive force with the second cover member 730 to which a force is applied in a shear direction may increase. Accordingly, when the stripping (or delamination) of the second cover member 730 is needed based on the damage or scratch of the second cover member 730, stripping (or delamination) may be easily performed in a 180-degree (180°) peel direction instead of a shear direction of the sixth adhesive member 905. For example, the sixth adhesive member 905 may have a high shear strain, and thus, may be configured to have a high adhesive force. In stripping (or delamination) of the sixth adhesive member 905, stripping (or delamination) may not be performed in a shear direction and may be performed in a 180-degree peel direction, and thus, a problem where stripping (or delamination) is not performed may be solved by a high adhesive force. Here, peel may denote a force per unit area when a force occurs in detaching from a substance. To check an adhesive force of an adhesive member, peel may be used. Also, 180-degree peel may be a method in which an element (or a substance) is pulled at a certain speed in opposite directions of a horizontal (or in opposite directions parallel to a horizontal direction).

According to an embodiment of the present disclosure, the anti-fingerprint part 722 on the first cover member 720 may have very low hydrophilicity by using a fluoride compound, and thus, a contact angle of the anti-fingerprint part 722 may be improved, thereby a characteristic of the anti-fingerprint part 722 may be improved. For example, as the hydrophilicity of a substance increases, water drops or liquid may be widely distributed on a surface, and thus, a contact angle may be reduced. For example, as the hydrophilicity of a substance decreases, a contact angle may increase. Accordingly, the anti-fingerprint part 722 may have low hydrophilicity by a fluoride compound, and thus, a contact angle may increase, thereby a characteristic of the anti-fingerprint part 722 may be improved. As a contact angle of the anti-fingerprint part 722 increases, the formation or coating performance of the anti-fingerprint part 722 may be strong, and thus, a characteristic of the anti-fingerprint part 722 may increase. A contact angle will be described below with reference to FIG. 9.

According to an embodiment of the present disclosure, the shear strain of the sixth adhesive member 905 between the first cover member 720 and the second cover member 730 may be configured to be high, and thus, the sixth adhesive member 905 where an adhesive force in a shear direction is enhanced may be configured. Also, an adhesive member may be removed in a 180-degree peel direction due to the damage or scratch of the second cover member 730, and thus, the attachment and/or stripping (or delamination) of the second cover member 730 may be easily performed. Also, a contact angle of the anti-fingerprint part 722 on the first cover member 720 may be configured to be high, thereby providing a display apparatus where an anti-fingerprint characteristic is enhanced.

According to an embodiment of the present disclosure, the adhesive members between the first cover member 720 and the second cover member 730 should endure a shear stress occurring in folding, so as to maintain a folding characteristic. Accordingly, a shear strain of the sixth adhesive member 905 between the first cover member 720 and the second cover member 730 may be configured to be high. For example, because the shear strain of the sixth adhesive member 905 between the first cover member 720 and the second cover member 730 is configured to be high or is the sixth adhesive member 905 is configured to have a high adhesive force, a folding characteristic may be maintained.

Figure 4B:
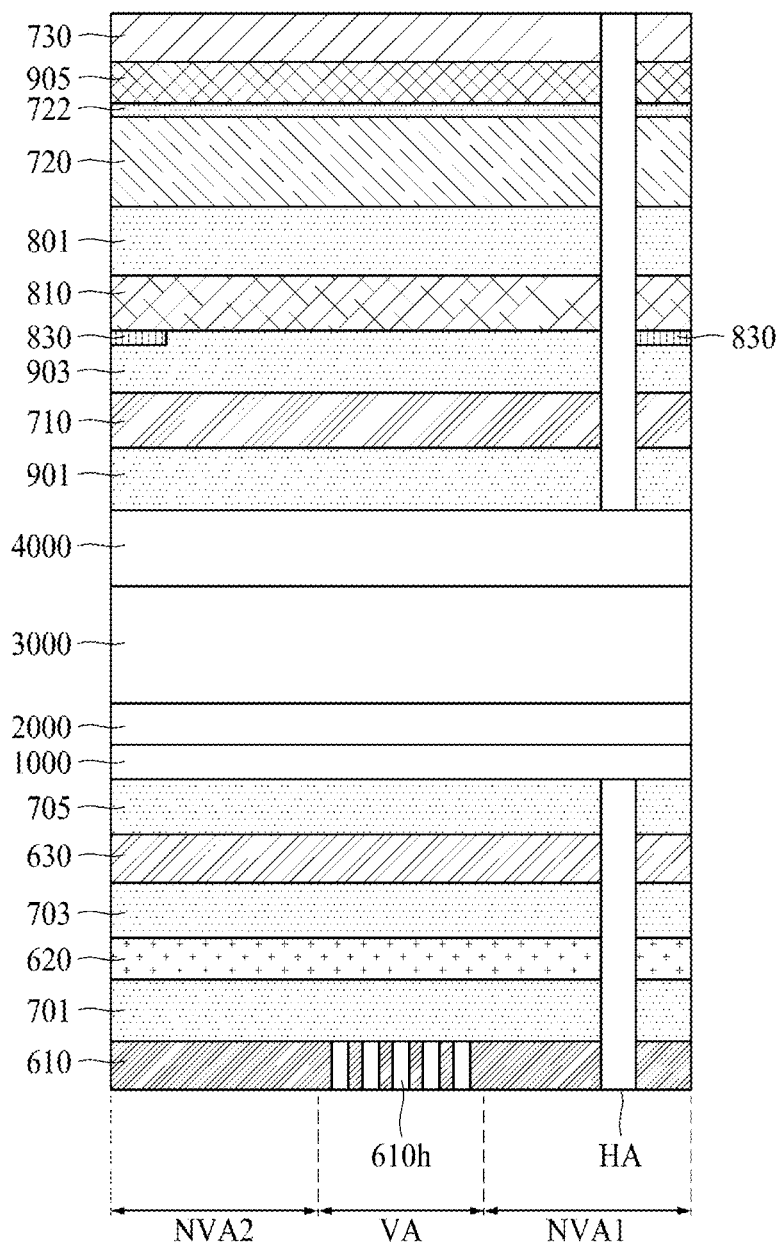
FIG. 4B illustrates a display apparatus according to another embodiment of the present disclosure.
Figure 4C:
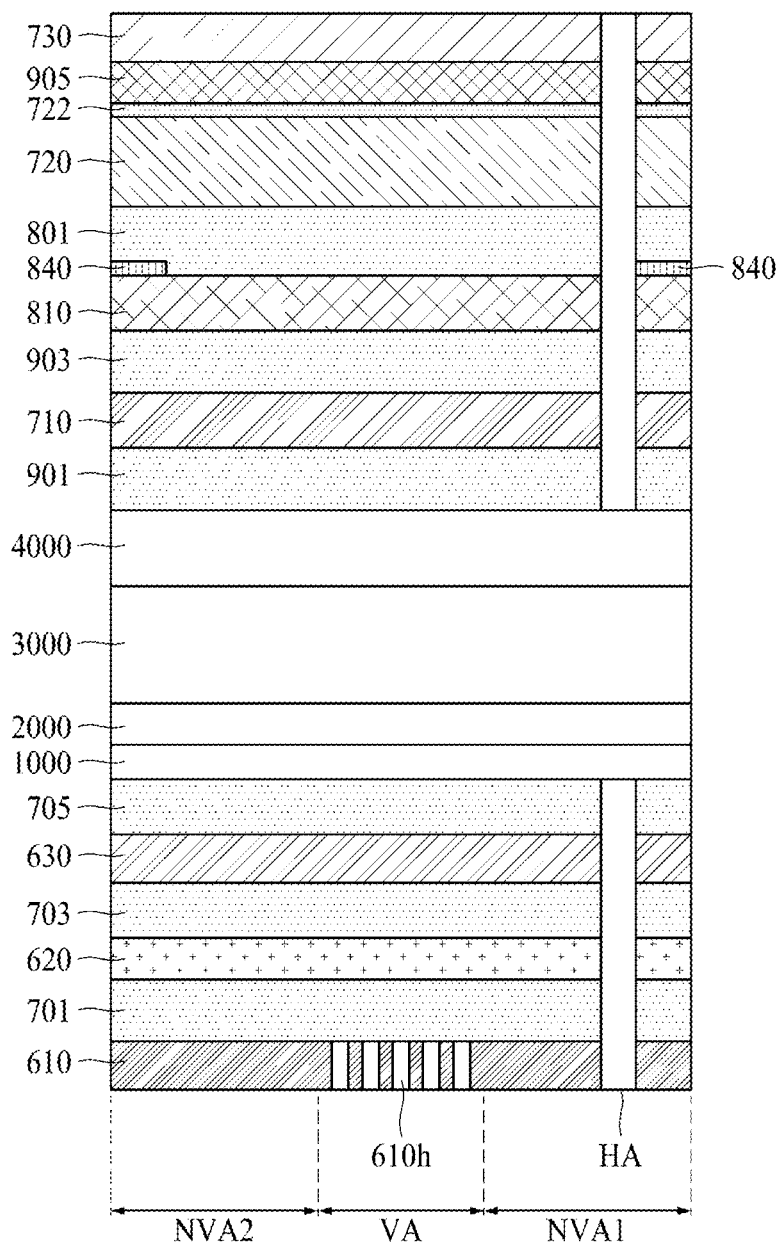
FIG. 4C illustrates a display apparatus according to another embodiment of the present disclosure.

FIGS. 4B and 4C illustrate a display apparatus according to another embodiment of the present disclosure.

A display apparatus 2 according to another embodiment of the present disclosure may be further provided a passivation layer 810 between a display panel 102 and a first cover member 720. For example, the passivation layer 810 may be further provided on a polarization member 710. For example, the passivation layer 810 may be disposed under the first cover member 720.

The passivation layer 810 may be a layer where a pattern, which is capable of being shown to a user even when the display panel 102 does not display an image, is formed. The passivation layer 810 may be a decoration layer or a decoration film, but the terms are not limited thereto.

A seventh adhesive member 801 may be disposed between the passivation layer 810 and the first cover member 720. For example, the seventh adhesive member 801 may include an OCA or an OCR. For example, the seventh adhesive member 801 may be a third adhesive member, but the terms are not limited thereto.

A patterned layer 830 may be disposed along a border portion of the passivation layer 810. For example, the patterned layer 830 may be disposed along the passivation layer 810 to correspond to a non-display area NA (or a bezel region) of the display panel 102. For example, the patterned layer 830 may be formed to have a rough shape or an uneven shape. For example, the patterned layer 830 may be a decoration layer and may be a layer where decoration is substantially printed or formed.

Referring to FIG. 4B, the patterned layer 830 may be formed under the passivation layer 810. According to a display apparatus 3 of FIG. 4C, a patterned layer 840 may be formed on the passivation layer 810. For example, the patterned layer 840 may be formed to have a rough shape or an uneven shape. For example, the patterned layer 840 may be a decoration layer where decoration is substantially printed or formed. The patterned layer 840 of FIG. 4C may be identically applied to FIGS. 5B and 6B. Also, a description of the patterned layer 830 may be identically applied to the patterned layer 840 of FIG. 4C.

For example, the patterned layer 830 may include various materials such as an organic material and an inorganic material, but embodiments of the present disclosure are not limited thereto. For example, the organic material may be black ink or carbon black, but embodiments of the present disclosure are not limited thereto. For example, the inorganic material may include SiOx, SiNx, and metal, but embodiments of the present disclosure are not limited thereto.

When the patterned layer 830 includes the organic material, the patterned layer 830 may be formed by a photoresist process, a silk printing process, or a coating process, but embodiments of the present disclosure are not limited thereto. When the patterned layer 830 includes the inorganic material, the patterned layer 830 may be formed by a deposition process, but embodiments of the present disclosure are not limited thereto.

As another example of the present disclosure, the patterned layer 830 may be formed of a color layer having a black color. In this case, even in a case where the display panel 102 does not display an image, a non-display area NA (or a bezel region) of the display panel 102 may be expressed in substantially the same color as a display area of the display panel 102, and thus, a screen of the display panel 102 may be widely shown to a user.

For example, the patterned layer 830 may be formed of a black matrix. The black matrix may be formed of an organic layer including a resin material. For example, the black matrix may be formed of a colored organic resin such as acryl, epoxy, or polyimide resin, which includes one of carbon black and a black pigment, but embodiments of the present disclosure are not limited thereto.

Descriptions of other elements except the passivation layer 810, the patterned layer 830, and the seventh adhesive member 801 may be substantially the same as the description of FIG. 4A, and thus, are omitted.

According to another embodiment of the present disclosure, the passivation layer 810 and the patterned layer 830 may be provided, thereby providing the display apparatus 2 where a screen of the display panel 102 is widely shown to a user along with the effects described above with reference FIG. 4A.

Figure 5A:
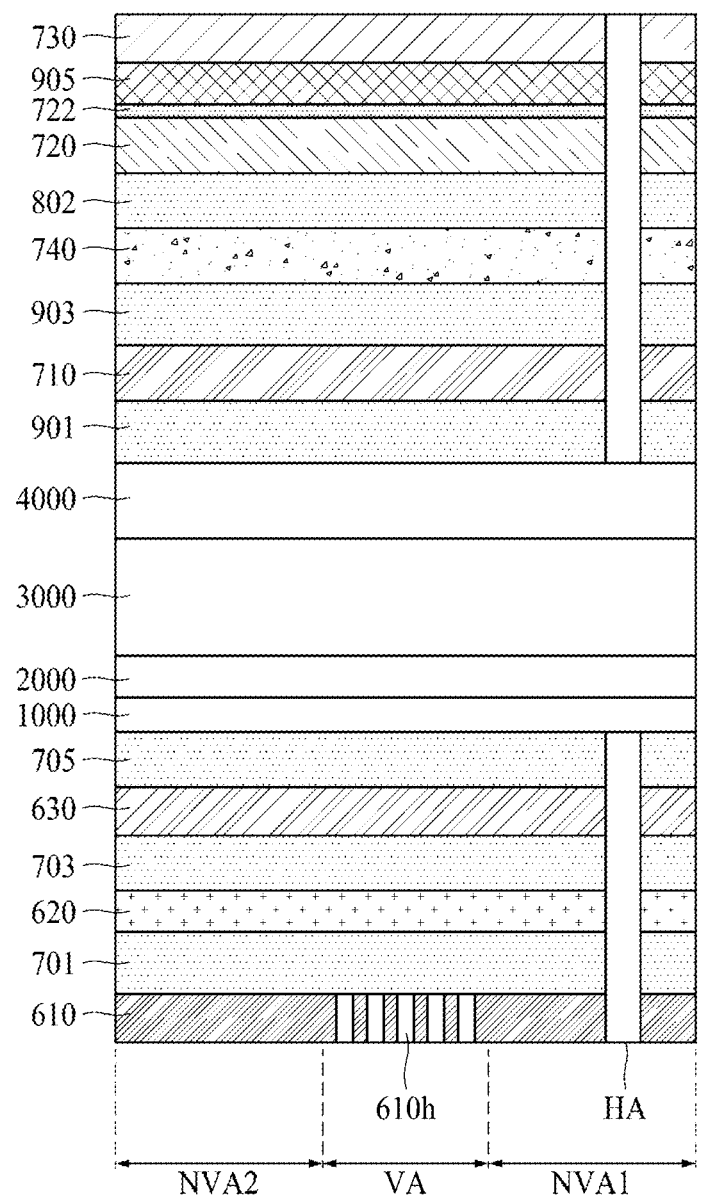
FIG. 5A illustrates a display apparatus according to another embodiment of the present disclosure.

FIG. 5A illustrates a display apparatus 4 according to another embodiment of the present disclosure.

A display apparatus 4 according to another embodiment of the present disclosure may further include a third cover member 740 between a display panel and a first cover member 720. For example, the third cover member 740 may be disposed on a polarization member 710. For example, the third cover member 740 may be disposed under the first cover member 720.

The third cover member 740 may protect the display apparatus 4 so that the display apparatus 4 is not scratched or damaged by an external impact or the display apparatus 4 and an emission part 2000 are not degraded by water (or moisture), oxygen, or particles flowing in from the outside. Also, the third cover member 740 may implement an effect such as the glossiness or flatness of a surface of the display apparatus 4.

An eighth adhesive member 802 may be disposed between the third cover member 740 and the first cover member 720. For example, the eighth adhesive member 802 may include an OCA or an OCR. For example, the eighth adhesive member 802 may be a third adhesive member, but the terms are not limited thereto.

Descriptions of other elements except the third cover member 740 and the eighth adhesive member 802 may be substantially the same as the description of FIG. 4A, and thus, are omitted.

According to another embodiment of the present disclosure, the third cover member 740 may be further provided, thereby providing the display apparatus 4 which may prevent damage caused by an external impact or water (or moisture), oxygen, or particles flowing in from the outside along with the effects described above with reference FIG. 4A.

Figure 5B:
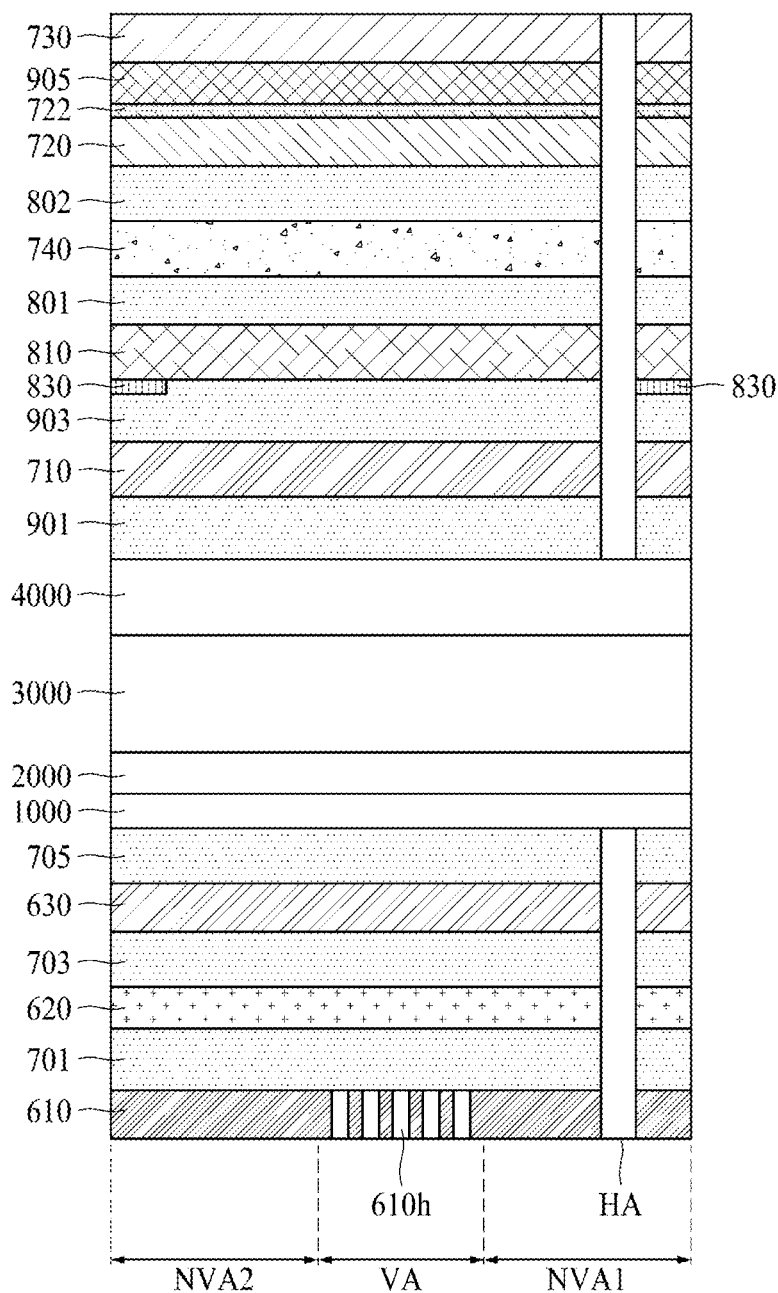
FIG. 5B illustrates a display apparatus according to another embodiment of the present disclosure.

FIG. 5B illustrates a display apparatus 5 according to another embodiment of the present disclosure.

A display apparatus 5 according to another embodiment of the present disclosure may further include a passivation layer 810 between a display panel and a first cover member 720. For example, the passivation layer 810 may be further provided on a polarization member 710. For example, the passivation layer 810 may be disposed under the first cover member 720. A seventh adhesive member 801 may be disposed between the passivation layer 810 and the first cover member 720. Also, a patterned layer 830 may be disposed along a border portion (or a perimeter portion) of the passivation layer 810. Descriptions of the passivation layer 810, the seventh adhesive member 801, and the patterned layer 830 may be substantially the same as the description of FIG. 4B, and thus, are omitted.

According to another embodiment of the present disclosure, a third cover member 740 may be further provided between the display panel and the first cover member 720. For example, the third cover member 740 may be disposed on the polarization member 710. For example, the third cover member 740 may be disposed under the first cover member 720. An eighth adhesive member 802 may be disposed between the third cover member 740 and the first cover member 720. Descriptions of the third cover member 740 and the eighth adhesive member 802 may be substantially the same as the description of FIG. 5A, and thus, are omitted.

According to another embodiment of the present disclosure, the passivation layer 810 and the patterned layer 830 may be provided, thereby providing the display apparatus 5 where a screen of the display panel 102 is widely shown to a user along with the effects described above with reference FIG. 4A. Also, the display apparatus 5 may be provided for more preventing damage caused by an external impact or water (or moisture), oxygen, or particles flowing in from the outside.

Figure 6A:
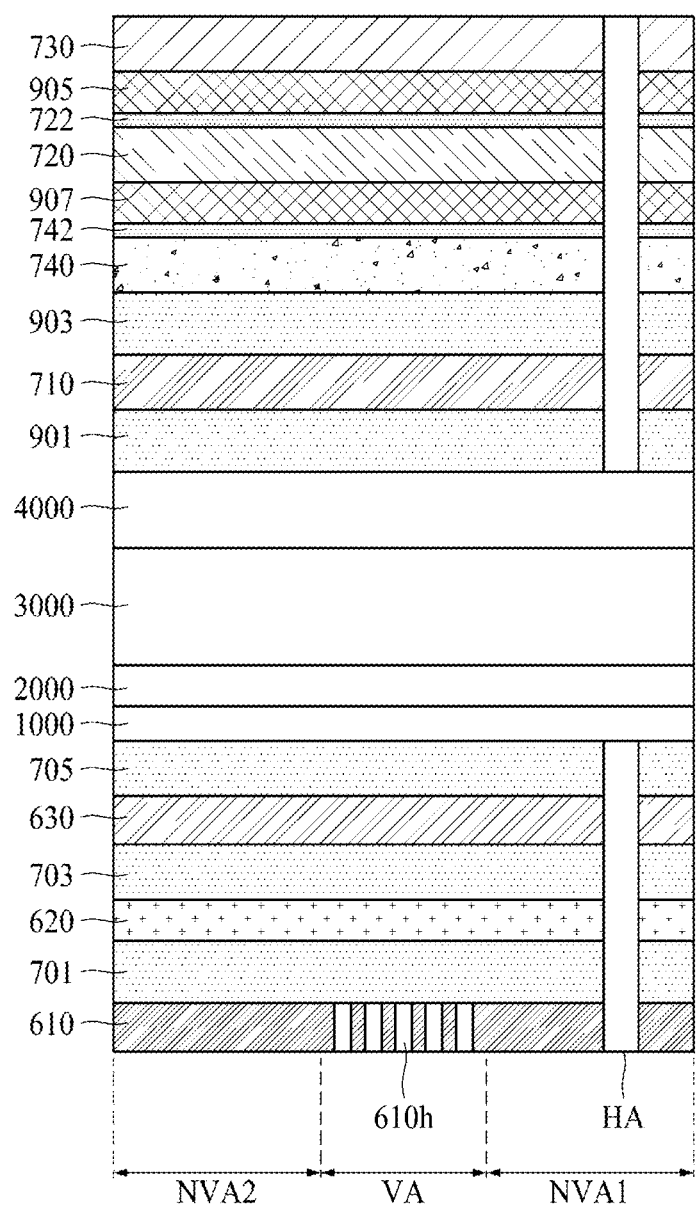
FIG. 6A illustrates a display apparatus according to another embodiment of the present disclosure.

FIG. 6A illustrates a display apparatus 6 according to another embodiment of the present disclosure.

A display apparatus 6 according to another embodiment of the present disclosure may further include a third cover member 740 between a display panel and a first cover member 720. For example, the third cover member 740 may be further provided on a polarization member 710. For example, the third cover member 740 may be disposed under the first cover member 720. Description of the third cover member 740 may be substantially the same as the description of FIG. 5A, and thus, are omitted.

According to another embodiment of the present disclosure, a ninth adhesive member 907 may be disposed between the third cover member 740 and the first cover member 720. The ninth adhesive member 907 may include a material which differs from that of the lower adhesive member (or the fourth adhesive member) 901 and/or the upper adhesive member (or the fifth adhesive member) 903. For example, a shear strain of the ninth adhesive member 907 may differ from a shear strain of the lower adhesive member (or the fourth adhesive member) 901 and/or the upper adhesive member (or the fifth adhesive member) 903. For example, the shear strain of the ninth adhesive member 907 may be higher than the shear strain of the lower adhesive member (or the fourth adhesive member) 901 and/or the upper adhesive member (or the fifth adhesive member) 903. The shear strain may be an action or a parameter where a force is applied to an object in directions opposite to each other in parallel to a cross-sectional direction. For example, when a shear strain of an adhesive member is high, an adhesive force of the adhesive member may increase. In an adhesive member where a shear strain is high, many strains may occur with respect to a shear direction, a time at which stripping (or delamination) occurs may be delayed, and a force occurring when the shear strain of the adhesive member occurs may be accumulated or increase, causing an increase in adhesive force of the adhesive member. According to another embodiment of the present disclosure, because the ninth adhesive member 907 is configured to have a high shear strain, a shear adhesive force may increase, and thus, an adhesive force with the third cover member 740 to which a force is applied in a shear direction may increase. Accordingly, when the stripping (or delamination) of the third cover member 740 is needed based on the damage or scratch of the third cover member 740, stripping (or delamination) may be easily performed in a 180-degree peel direction instead of a shear direction of the ninth adhesive member 907. For example, the ninth adhesive member 907 may have a high shear strain, and thus, may be configured to have a high adhesive force. In stripping (or delamination) of the ninth adhesive member 907, stripping (or delamination) may not be performed in a shear direction and may be performed in a 180-degree peel direction, and thus, a problem where stripping (or delamination) is not performed may be solved by a high adhesive force. For example, the ninth adhesive member 907 may be configured to have a shear strain equal to the sixth adhesive member 905. For example, the ninth adhesive member 907 may include the same material as that of the sixth adhesive member 905. For example, the ninth adhesive member 907 may be a fourth adhesive member, but embodiments of the present disclosure are not limited thereto.

According to another embodiment of the present disclosure, an anti-fingerprint part 742 may be formed in the third cover member 740. For example, the anti-fingerprint part 742 may be formed on the third cover member 740 or may be coated or formed thereon, so as to prevent or remove pollution from a fingerprint. Also, the anti-fingerprint part 742 may enhance a sense of touch.

Figure 6B:
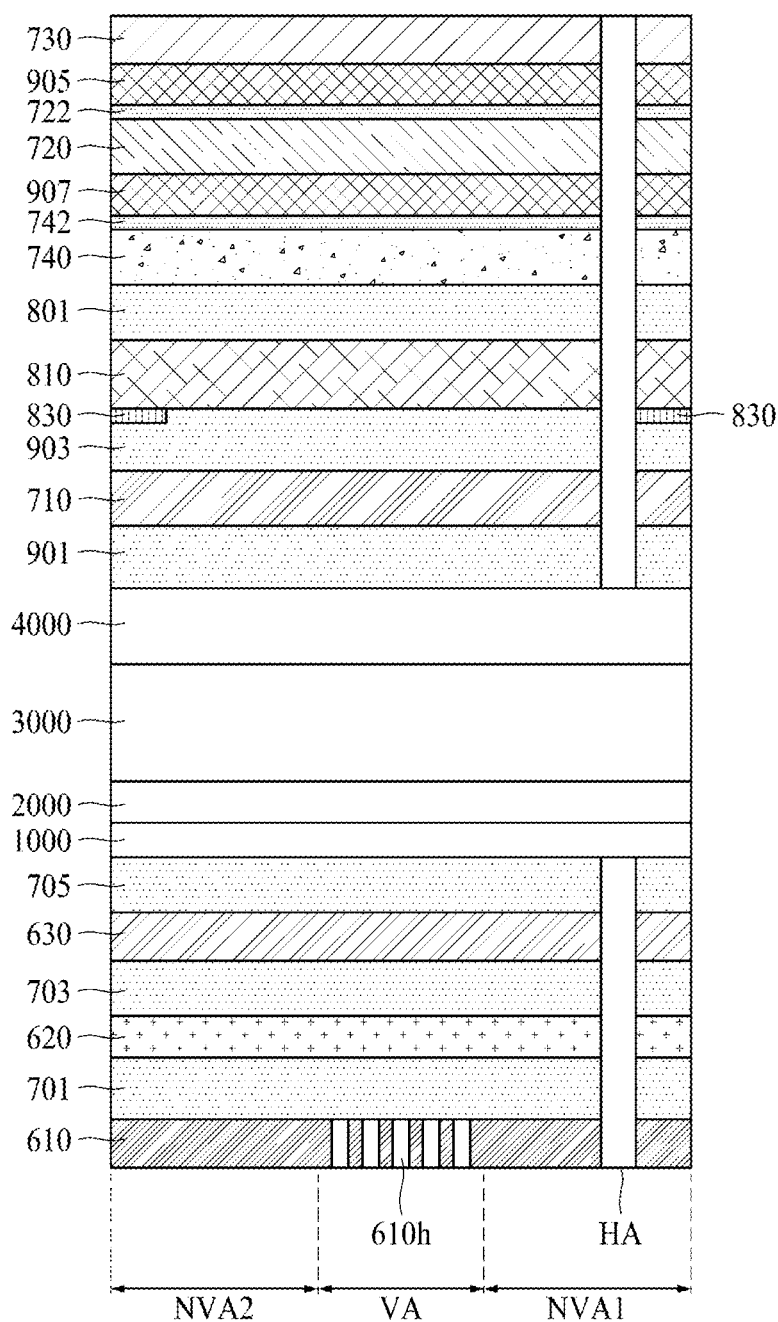
FIG. 6B illustrates a display apparatus according to another embodiment of the present disclosure.

FIG. 6B illustrates a display apparatus 7 according to another embodiment of the present disclosure.

The display apparatus 7 according to another embodiment of the present disclosure may further include a passivation layer 810 between a display panel and a first cover member 720. For example, the passivation layer 810 may be further provided on a polarization member 710. For example, the passivation layer 810 may be disposed under the first cover member 720. A seventh adhesive member 801 may be disposed between the passivation layer 810 and the first cover member 720. Also, a patterned layer 830 may be disposed along a border portion of the passivation layer 810. Descriptions of the passivation layer 810, the seventh adhesive member 801, and the patterned layer 830 may be substantially the same as the description of FIG. 4B, and thus, are omitted.

According to another embodiment of the present disclosure, a third cover member 740 may be further provided between the display panel and the first cover member 720. For example, the third cover member 740 may be disposed on the polarization member 710. For example, the third cover member 740 may be disposed under the first cover member 720. A ninth adhesive member 907 may be disposed between the third cover member 740 and the first cover member 720. Description of the third cover member 740 may be substantially the same as the description of FIG. 5A, and thus, are omitted.

According to another embodiment of the present disclosure, the ninth adhesive member 907 may be disposed between the third cover member 740 and the first cover member 720. Description of the ninth adhesive member 907 may be substantially the same as the description of FIG. 6A, and thus, are omitted.

According to another embodiment of the present disclosure, an anti-fingerprint part 742 may be formed on the third cover member 740. For example, the anti-fingerprint part 742 may be formed on the third cover member 740 or may be coated or formed thereon, so as to prevent or remove pollution from a fingerprint.

Figure 7:
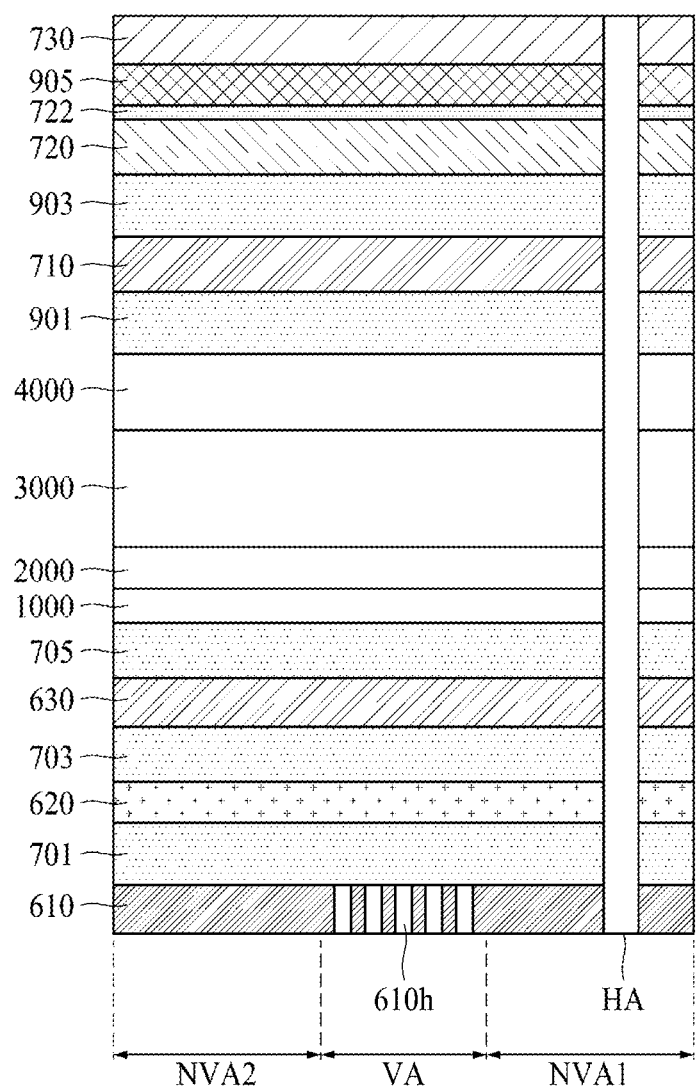
FIG. 7 illustrates a display apparatus according to another embodiment of the present disclosure.

FIG. 7 illustrates a display apparatus 8 according to another embodiment of the present disclosure.

FIG. 7 illustrates another embodiment of a hole region HA in the display apparatus of FIG. 4A. Description of FIG. 7 may be identically applied to FIGS. 4B to 6B. For example, the hole region HA of FIG. 7 may be identically applied to FIGS. 4B to 6B.

The display apparatus 8 according to another embodiment of the present disclosure may include a hole region HA which is provided up to a portion of one or more cover members from a portion of one or more plates. For example, the hole region HA may be provided up to a portion of a first cover member 720 and a second cover member 730 from a portion of a first plate 610, a second plate 620, and a third plate 630. For example, a hole region HA in one or more of the first plate 610, the second plate 620, and the third plate 630 may be an empty space. The hole region HA may be disposed in a transistor part 1000, an emission part 2000, an encapsulation part 3000, and a touch part 4000. For example, the hole region HA may be disposed in one or more of the first plate 610, the second plate 620, and the third plate 630, the transistor part 1000, the emission part 2000, the encapsulation part 3000, the touch part 4000, and one or more of the first cover member 720 and the second cover member 730. For example, the hole region HA may be disposed in the first plate 610, the second plate 620, the third plate 630, the transistor part 1000, the emission part 2000, the encapsulation part 3000, the touch part 4000, the first cover member 720, and the second cover member 730. The display apparatus 8 where the hole region HA of FIG. 7 is disposed may be referred as a hole in display (HID), but the terms are not limited thereto. For example, one or more of a camera, a sensor, and an optical part (or an optical component) may be disposed in the hole region HA, but embodiments of the present disclosure are not limited thereto. For example, the sensor may include an infrared sensor, but embodiments of the present disclosure are not limited thereto.

Figure 8:
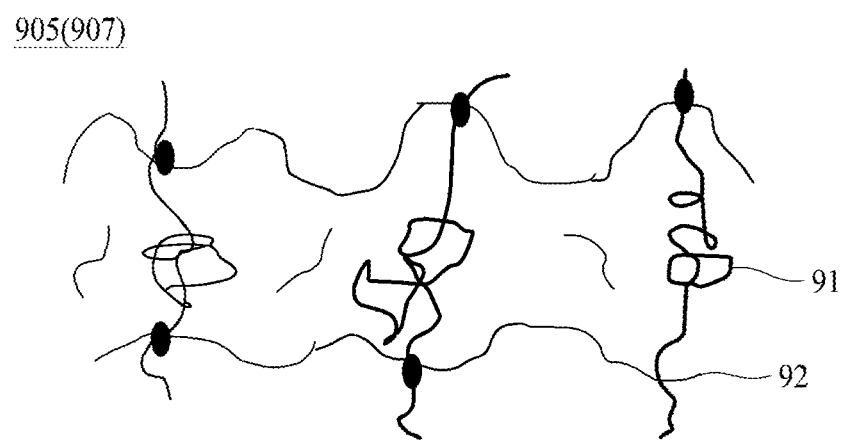
FIG. 8 illustrates an adhesive member according to an embodiment of the present disclosure.

FIG. 8 illustrates an adhesive member according to an embodiment of the present disclosure.

FIG. 8 illustrates a sixth adhesive member 905 and a ninth adhesive member 907 which are adhesive members according to an embodiment of the present disclosure.

Referring to FIG. 8, each of the sixth and ninth adhesive members 905 and 907 according to an embodiment of the present disclosure may include monomers having different glass transition temperatures. A glass transition temperature Tg may be a temperature at which a Brownian motion of a polymer chain is activated. When a glass transition temperature is undergone, a polymer such as stiff glass (or a hard glass-like polymer) may have a feature such as soft rubber.

Each of the sixth and ninth adhesive members 905 and 907 according to an embodiment of the present disclosure may include a monomer 91 (illustrated by a thick solid line) having a low (or relatively low) glass transition temperature and a monomer 92 (illustrated by a thin solid line) having a high (or relatively high) glass transition temperature. For example, the high glass transition temperature may be 40° C. to −20° C. or more, but embodiments of the present disclosure are not limited thereto. For example, the low glass transition temperature may be −40° C. to −20° C. or less, but embodiments of the present disclosure are not limited thereto.

According to an embodiment of the present disclosure, a compound having the low glass transition temperature may be represented by the following Formula 1, but embodiments of the present disclosure are not limited thereto.

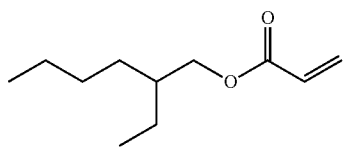

Formula 1

Formula 1 may be 2-ethylhexyl acrylate, and the glass transition temperature may be −50° C.

According to an embodiment of the present disclosure, a compound having the high glass transition temperature may be represented by the following Formulas, but embodiments of the present disclosure are not limited thereto.

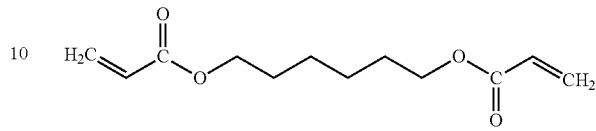

Formula 2

Formula 2 may be hexanediol diacrylate, and the glass transition temperature may be 43° C.

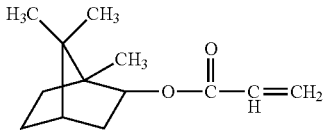

Formula 3

Formula 3 may be isobornyl acrylate, and the glass transition temperature may be 94° C.

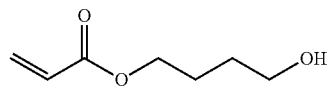

Formula 4

Formula 4 may be hydroxybutyl acrylate, and the glass transition temperature may be −35° C.

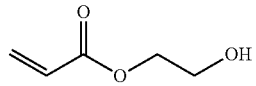

Formula 5

Formula 5 may be hydroxyethyl acrylate, and the glass transition temperature may be −15° C.

The sixth and ninth adhesive members 905 and 907 according to an embodiment of the present disclosure may be formed by mixing the monomer 91 having the low glass transition temperature with the monomer 92 having the high glass transition temperature. For example, the adhesive members 905 and 907 according to an embodiment of the present disclosure may be formed by mixing two or more of Formula 1 and Formulas 2 to 5.

Each of molecular weights of the sixth and ninth adhesive members 905 and 907 according to an embodiment of the present disclosure may be 700,000 to 1,000,000, but embodiments of the present disclosure are not limited thereto. A cross-linking rate of each of the sixth and ninth adhesive members 905 and 907 according to an embodiment of the present disclosure may be 85% or less, but embodiments of the present disclosure are not limited thereto.

An adhesive force of each of the sixth and ninth adhesive members 905 and 907 according to an embodiment of the present disclosure may be 100 gf/inch (gram force/inch) or less in 180-degree peel, but embodiments of the present disclosure are not limited thereto. A unit of the adhesive force may be gf/inch and may be a multiplication of a gram measured per 1 inch and a force in a direction of gravity.

The adhesive force of each of the sixth and ninth adhesive members 905 and 907 according to an embodiment of the present disclosure may be 500 gf/inch (gram force/inch) or more in lab-shear peel, but embodiments of the present disclosure are not limited thereto. Lab-shear peel may denote a method in which a force is applied in a shear direction to measure an adhesive force in a direction parallel to a cross-section.

Each of the sixth and ninth adhesive members 905 and 907 according to an embodiment of the present disclosure may include polyethylene terephthalate, but embodiments of the present disclosure are not limited thereto.

According to an embodiment of the present disclosure, the adhesive member including the monomer 91 having the low glass transition temperature and the monomer 92 having the high glass transition temperature may be provided, thereby implementing an adhesive member which has a high shear strain and where internal cohesion is enhanced and an adhesive force is enhanced.

The following Table 1 shows a storage modulus and an adhesive force of an adhesive member between the first cover member 720 and the second cover member 730.

TABLE 1

| Items | | Experimental Example 1 | Experimental Example 2 | Embodiment |
|---|---|---|---|---|
| Storage Modulus (Pa) | Room Temperature | $4.7 \times 10^4$ | $3.4 \times 104$ | $2.6 \times 10^4$ |
| | High Temperature | $2.4 \times 10^4$ | $2.0 \times 104$ | $8.8 \times 10^3$ |
| Adhesive Force (kgf/inch) | | 0.85 | 1.84 | 2.19 |
| Adhesive Force (gf/inch) | | 5.71 | 15.20 | 3.20 |

In Table 1, the experimental example 1 and the experimental example 2 are configured with an acrylic adhesive member. The embodiment of the present disclosure is configured with the sixth adhesive member 905 described above with reference to FIG. 4A. The embodiment of Table 1 may be identically applied to details of the adhesive member of FIGS. 4B to 7. For example, the embodiment of Table 1 may be substantially identically applied to the sixth adhesive member 905 between the first cover member 720 and the second cover member 730 illustrated in FIGS. 4A, 4B, 5A, 5B, and 7. For example, the embodiment of Table 1 may be substantially identically applied to the sixth adhesive member 905 between the first cover member 720 and the second cover member 730 and the ninth adhesive member 907 between the first cover member 720 and the third cover member 740 illustrated in FIGS. 6A and 6B.

In Table 1, a storage modulus G' represents a storage modulus in a room temperature and a high temperature. The room temperature may be 25° C. and the high temperature may be 80° C., but embodiments of the present disclosure are not limited thereto. The storage modulus G' may be an original modulus. For example, comparing a soft sponge with a stiff sponge, a storage modulus may be relatively large when a sponge is stiff. Considering a storage modulus in the room temperature, the experimental example 1 has been measured to be $4.7 \times 10^4$, the experimental example 2 has been measured to be $3.4 \times 10^4$, and the embodiment of the present disclosure has been measured to be $2.6 \times 10^4$. Considering a storage modulus in the high temperature, the experimental example 1 has been measured to be $2.4 \times 10^4$, the experimental example 2 has been measured to be 2.0× $10^4$, and the embodiment of the present disclosure has been measured to be $8.8 \times 10^3$. Accordingly, because the storage modulus in the room temperature and the high temperature in the embodiment of the present disclosure is lower than the experimental example 1 and the experimental example 2, it may be seen that the adhesive member according to the embodiment of the present disclosure is an adhesive member having a soft characteristic.

The adhesive force (kgf/inch (kilogram force/inch)) has been obtained by measuring an adhesive force of an adhesive member between the second cover member 730 and the first cover member 720 including an anti-fingerprint part and/or the third cover member 740 including an anti-fingerprint part in lab-shear peel. The experimental example 1 has been measured to be 0.85 kgf/inch, the experimental example 2 has been measured to be 1.84 kgf/inch, and the embodiment of the present disclosure has been measured to be 2.19 kgf/inch. Accordingly, it may be seen that the adhesive force of the adhesive member according to the embodiment of the present disclosure is stronger than the experimental example 1 and the experimental example 2. For example, the adhesive member according to the embodiment of the present disclosure may be an adhesive member where an adhesive force is strong, and thus, it may be seen that the adhesive member according to the embodiment of the present disclosure is an adhesive member capable of maintaining a folding characteristic.

The adhesive force (gf/inch (gram force/inch)) has been obtained by measuring an adhesive force of an adhesive member between the second cover member 730 and the first cover member 720 including the anti-fingerprint part and/or the third cover member 740 including the anti-fingerprint part in 180-degree peel. The experimental example 1 has been measured to be 5.71 gf/inch, the experimental example 2 has been measured to be 15.20 gf/inch, and the embodiment of the present disclosure has been measured to be 3.20 gf/inch. Accordingly, it may be seen that the adhesive force of the adhesive member according to the embodiment of the present disclosure is weaker than the experimental example 1 and the experimental example 2. For example, it may be seen that the adhesive member according to the embodiment of the present disclosure is an adhesive member which is easily stripped (or delaminated) in stripping (or delamination) of the adhesive member.

FIG. 9 illustrates a contact angle of an anti-fingerprint part provided on a cover member according to another embodiment of the present disclosure.

FIG. 9 shows a result obtained by measuring a contact angle of the anti-fingerprint part 722 or 742 provided on the first cover member 720 and/or the third cover member 740 described above with reference to FIGS. 4A to 7 according to an embodiment of the present disclosure. In FIG. 9, A and B represent a contact angle in a room temperature. The room temperature may be 25° C., but embodiments of the present disclosure are not limited thereto. For example, A and B may be a contact angle measured in the room temperature under a condition where surfaces, where the degrees of formation or coating of anti-fingerprints part differ, are provided. For example, the surface of A and the surface of B may be configured under a condition where coating processing times differ, but embodiments of the present disclosure are not limited thereto. For example, A is based on a condition where a coating processing time of an anti-fingerprint part is 100 sec to 180 sec and B is based on a condition where a coating processing time of an anti-fingerprint part is 20 sec to 50 sec, but embodiments of the present disclosure are not limited thereto.

Referring to FIG. 9, a contact angle of A has been measured to be average 114.0 degrees)(°. A contact angle of B has been measured to be average 92.7 degrees. For example, the contact angle of A has been measured to be higher than the contact angle of B. As a contact angle increases, an anti-fingerprint characteristic is enhanced. Accordingly, it may be seen that an anti-fingerprint characteristic of A is higher than an anti-fingerprint characteristic of B. For example, a contact angle of an anti-fingerprint part according to an embodiment of the present disclosure may be configured to be 110 degrees or more. For example, when a contact angle of an anti-fingerprint part is less than 100 degrees, an adhesive force in 180-degree peel may be 100 gf/inch, and thus, there may be a problem where it is difficult to stripe (or delaminate) the adhesive member. For example, when a contact angle of an anti-fingerprint part is less than 100 degrees, as described with reference to Table 1, the experimental example 1 and the experimental example 2 have a problem where it is more difficult to stripe (or delaminate) an adhesive member of a cover member than an embodiment of the present disclosure. According to an embodiment of the present disclosure, a contact angle of an anti-fingerprint part provided on a cover member may be configured to be high, thereby providing a display apparatus where an anti-fingerprint characteristic is enhanced. According to an embodiment of the present disclosure, an adhesive member having a high shear strain may be provided on an anti-fingerprint where an anti-fingerprint characteristic of a cover member is enhanced. Accordingly, an anti-fingerprint part where an anti-fingerprint characteristic of a cover member is enhanced may be configured, and an adhesive member where an adhesive force is enhanced by an adhesive member having a high shear strain may be provided, thereby providing a display apparatus for enhancing a folding characteristic and/or folding reliability. According to an embodiment of the present disclosure, in stripping (or delamination) of a cover member, an adhesive member may be easily stripped (or delaminated) in a 180-degree peel direction instead of a shear direction of the adhesive member.

An apparatus according to an embodiment of the present disclosure may be applied to or included in mobile devices, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, e-books, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, cinema display apparatuses, televisions (TVs), wall paper display apparatuses, signage apparatuses, game machines, notebook computers, monitors, cameras, camcorders, home appliances, etc. Also, the apparatus according to an embodiment of the present disclosure may be applied to or included in an organic light emitting lighting apparatus or an inorganic light emitting lighting apparatus.

A display apparatus according to various embodiments of the present disclosure will be described below.

A display apparatus according to various embodiments of the present disclosure may include a display panel, a first adhesive member on the display panel, a first cover member on the first adhesive member, a second adhesive member on the first cover member, the second adhesive member including a material different from a material of the first adhesive member, and a second cover member on the second adhesive member.

According to various embodiments of the present disclosure, a shear strain of the first adhesive member may differ from a shear strain of the second adhesive member.

According to various embodiments of the present disclosure, a shear strain of the first adhesive member may be lower than a shear strain of the second adhesive member.

According to various embodiments of the present disclosure, the second adhesive member may include monomers having different glass transition temperatures.

According to various embodiments of the present disclosure, an anti-fingerprint part may be provided on the first cover member.

According to various embodiments of the present disclosure, the display apparatus may further include a passivation layer between the display panel and the first cover member.

According to various embodiments of the present disclosure, another adhesive member may be disposed between the passivation layer and the first cover member.

According to various embodiments of the present disclosure, a patterned layer may be disposed along a border portion of the passivation layer.

According to various embodiments of the present disclosure, the display apparatus may further include a third cover member between the display panel and the first cover member.

According to various embodiments of the present disclosure, an anti-fingerprint part may be provided on at least one of the first cover member and the third cover member.

According to various embodiments of the present disclosure, the display apparatus may further include a fourth adhesive member between the first cover member and the third cover member, the fourth adhesive member may include the same material as a material of the second adhesive member.

According to various embodiments of the present disclosure, the display apparatus may further include a passivation layer between the display panel and the first cover member, and a third cover member on the passivation layer.

According to various embodiments of the present disclosure, an anti-fingerprint part may be provided on at least one of the first cover member and the third cover member.

According to various embodiments of the present disclosure, the display apparatus may further include a fourth adhesive member between the first cover member and the third cover member, the fourth adhesive member may include the same material as a material of the second adhesive member.

According to various embodiments of the present disclosure, the display apparatus may further include one or more plates under the display panel, and one or more fifth adhesive members between two or more plates among the one or more plates.

According to various embodiments of the present disclosure, at least one of the one or more plates may further include one or more opening patterns.

According to various embodiments of the present disclosure, the display apparatus is a variable display apparatus including a variable region and a non-variable region, and the one or more opening patterns correspond to the variable region.

According to various embodiments of the present disclosure, the display panel may further include a hole region, and the hole region may be in a portion of each of the one or more plates and a portion of at least one of the first cover member and the second cover member.

According to various embodiments of the present disclosure, the display panel may include a transistor part and an emission part, and the display apparatus may further include an encapsulation part on the emission part, and a touch part on the encapsulation part.

According to various embodiments of the present disclosure, the display panel may further include a hole region, and the hole region may be in a portion of at least one of the one or more plates, the transistor part, the emission part, the encapsulation part, the touch part, the first cover member, and the second cover member.

According to various embodiments of the present disclosure, one or more of a camera, a sensor, and an optical part may be disposed in the hole region.

According to various embodiments of the present disclosure, the first adhesive member may include the same material as a material of the one or more fifth adhesive members.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims and their equivalents.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
   a display panel;
   a first adhesive member on the display panel;
   a first cover member on the first adhesive member;
   a first anti-fingerprint part on the first cover member, the first anti-fingerprint part having a fluoride compound;
   a second adhesive member on the first anti-fingerprint part, the second adhesive member including a material different from a material of the first adhesive member and having a shear strain higher than a shear strain of the first adhesive member; and
   a second cover member on the second adhesive member.

2. The display apparatus of claim 1, wherein the second adhesive member comprise monomers having different glass transition temperatures.

3. The display apparatus of claim 1, further comprising a passivation layer between the display panel and the first cover member.

4. The display apparatus of claim 3, wherein a third adhesive member is disposed between the passivation layer and the first cover member.

5. The display apparatus of claim 3, further comprising a patterned layer of a black matrix is disposed along a border portion of the passivation layer.

6. The display apparatus of claim 5, wherein the patterned layer comprises at least one of a black matrix, a decoration layer, and a color layer.

7. The display apparatus of claim 1, further comprising a third cover member between the display panel and the first cover member.

8. The display apparatus of claim 7, further comprising a second anti-fingerprint part is provided on the third cover member.

9. The display apparatus of claim 7, further comprising a third adhesive member between the first cover member and the third cover member,
   wherein the third adhesive member comprises a same material as the material of the second adhesive member.

10. The display apparatus of claim 9, further comprising a second anti-fingerprint part provided on the third cover member,
    wherein the third adhesive member is on the second anti-fingerprint part.

11. The display apparatus of claim 1, further comprising:
    a passivation layer between the display panel and the first cover member; and
    a third cover member on the passivation layer.

12. The display apparatus of claim 11, further comprising a second anti-fingerprint part is provided on the third cover member.

13. The display apparatus of claim 11, further comprising a third adhesive member between the first cover member and the third cover member,
    wherein the third adhesive member comprises a same material as the material of the second adhesive member.

14. The display apparatus of claim 1, comprising:
    a polarization member between the first cover member and the display panel; and
    a third adhesive member between the display panel and the polarization member,
    wherein the first adhesive member is between the polarization member and the first cover member.

15. The display apparatus of claim 14, wherein the shear strain of the second adhesive member is higher than a shear strain of the third adhesive member.

16. A device, comprising:
    a display;
    a first adhesive on the display;
    a first cover on the first adhesive;
    a first anti-fingerprint layer on the first cover, the first anti-fingerprint layer having a fluoride compound;
    a second adhesive on the first anti-fingerprint layer, the second adhesive being a different material than the first adhesive and having a shear strain higher than a shear strain of the first adhesive; and
    a second cover on the second adhesive.

17. The device of claim 16, further comprising:
    one or more plates under the display; and
    one or more third adhesive between two or more plates among the one or more plates.

18. The device of claim 17, wherein at least one of the one or more plates further comprises one or more opening patterns.

19. The device of claim 18, wherein the display is a variable display including a variable region and a non-variable region, and the one or more opening patterns correspond to the variable region.

20. The device of claim 17, wherein the display further comprises a hole region, and wherein the hole region is in a portion of each of the one or more plates and a portion of at least one of the first cover or the second cover.

21. The device of claim 20, wherein one or more of a camera, a sensor, and an optical part are disposed in the hole region.

22. The device of claim 17, wherein the first adhesive comprises a same material as the one or more third adhesive.

23. The device of claim 16, wherein the display comprises:
    a transistor part and an emission part;
    an encapsulation part on the emission part; and
    a touch part on the encapsulation part.

24. The device of claim 23, wherein the display further comprises a hole region, and
    wherein the hole region is in a portion of at least one of the one or more plates, the transistor part, the emission part, the encapsulation part, the touch part, the first cover, or the second cover.

* * * * *

UNITED STATES PATENT AND TRADEMARK OFFICE
CERTIFICATE OF CORRECTION

| | |
|---|---|
| PATENT NO. | : 12,094,371 B2 |
| APPLICATION NO. | : 18/240982 |
| DATED | : September 17, 2024 |
| INVENTOR(S) | : Yeonjae Jeong |

It is certified that error appears in the above-identified patent and that said Letters Patent is hereby corrected as shown below:

In the Claims

<u>Column 37, Claim 5, Line 66:</u>
"black matrix is disposed"
Should read:
--black matrix disposed--.

<u>Column 38, Claim 8, Line 8:</u>
"anti-fingerprint part is provided"
Should read:
--anti-fingerprint part provided--.

<u>Column 38, Claim 12, Line 26:</u>
"anti-fingerprint part is provided"
Should read:
--anti-fingerprint part provided--.

Signed and Sealed this
Twelfth Day of November, 2024

Katherine Kelly Vidal
*Director of the United States Patent and Trademark Office*